(12) United States Patent
Tsukagoshi et al.

(10) Patent No.: US 11,290,785 B2
(45) Date of Patent: Mar. 29, 2022

(54) TRANSMISSION APPARATUS, TRANSMISSION METHOD, RECEPTION APPARATUS, AND RECEPTION METHOD FOR TRANSMITTING SUBTITLE TEXT INFORMATION

(71) Applicant: SONY CORPORATION, Tokyo (JP)

(72) Inventors: Ikuo Tsukagoshi, Tokyo (JP); Kazuhiko Takabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/068,825

(22) PCT Filed: Jan. 17, 2017

(86) PCT No.: PCT/JP2017/001434
§ 371 (c)(1),
(2) Date: Jul. 9, 2018

(87) PCT Pub. No.: WO2017/126509
PCT Pub. Date: Jul. 27, 2017

(65) Prior Publication Data
US 2019/0028773 A1    Jan. 24, 2019

(30) Foreign Application Priority Data

Jan. 19, 2016  (JP) .............................. JP2016-008353

(51) Int. Cl.
*H04N 21/236* (2011.01)
*H04N 21/488* (2011.01)
(Continued)

(52) U.S. Cl.
CPC ......... *H04N 21/4884* (2013.01); *H04N 5/278* (2013.01); *H04N 21/236* (2013.01);
(Continued)

(58) Field of Classification Search
CPC ............. H04N 21/4884; H04N 21/236; H04N 21/431; H04N 21/4348; H04N 21/435; H04N 21/8547; H04N 5/278
See application file for complete search history.

(56) References Cited

U.S. PATENT DOCUMENTS

2005/0097463 A1*  5/2005  Yu ..................... H04M 1/72544
                                            715/246
2006/0233531 A1* 10/2006  Toyama ............... G11B 27/102
                                            386/241

(Continued)

FOREIGN PATENT DOCUMENTS

CN     101111898 A     1/2008
JP     2012-169885 A   9/2012

(Continued)

OTHER PUBLICATIONS

Extended European Search Report dated Sep. 19, 2018 in corresponding European Patent Application No. 17741387.9, 9 pages.

(Continued)

*Primary Examiner* — Jefferey F Harold
*Assistant Examiner* — Alexander Boyd
(74) *Attorney, Agent, or Firm* — Oblon, McClelland, Maier & Neustadt, L.L.P.

(57) ABSTRACT

An apparatus and method to enhance transmission efficiency in partially adding or changing subtitle display, for example. A document of subtitle text information with display timing information is divided into a plurality of pieces. A plurality of packets having each divided piece arranged in a payload are generated. The packets are sequentially transmitted. For example, packet type information corresponding to an attribute of a divided piece arranged in the payload of a packet is arranged in the header of the packet. Further, for example, when a divided piece arranged in the payload of a packet is subtitle information to be displayed in a predetermined (Continued)

region, identification information indicating the predetermined region is arranged in the header of the packet.

9 Claims, 23 Drawing Sheets

(51) Int. Cl.
| | | |
|---|---|---|
| *H04N 21/435* | (2011.01) | |
| *H04N 5/278* | (2006.01) | |
| *H04N 21/434* | (2011.01) | |
| *H04N 21/431* | (2011.01) | |
| *H04N 21/8547* | (2011.01) | |

(52) U.S. Cl.
CPC ......... *H04N 21/431* (2013.01); *H04N 21/435* (2013.01); *H04N 21/4348* (2013.01); *H04N 21/8547* (2013.01)

(56) References Cited

U.S. PATENT DOCUMENTS

| | | | | |
|---|---|---|---|---|
| 2007/0280295 | A1* | 12/2007 | Uchimura | G11B 27/3027 370/485 |
| 2007/0288840 | A1* | 12/2007 | Girle | G06F 40/221 715/234 |
| 2008/0040498 | A1* | 2/2008 | Setlur | H04N 21/8543 709/231 |
| 2011/0128351 | A1* | 6/2011 | Newton | H04N 5/278 348/43 |
| 2015/0089560 | A1 | 3/2015 | Park et al. | |
| 2017/0064371 | A1 | 3/2017 | Kitazato et al. | |
| 2017/0302900 | A1* | 10/2017 | Besnard | H04N 21/4884 |
| 2017/0311045 | A1* | 10/2017 | Besnard | H04N 21/4307 |

FOREIGN PATENT DOCUMENTS

| | | | | |
|---|---|---|---|---|
| JP | 2015-518347 | A | | 6/2015 |
| JP | 2015109131 | A | * | 6/2015 |
| JP | 2015-216524 | A | | 12/2015 |
| JP | 2015230099 | A | | 12/2015 |
| JP | 2016-6958 | A | | 1/2016 |
| JP | 2016-110645 | A | | 6/2016 |

OTHER PUBLICATIONS

"Coding of Moving Pictures and Audio", ISO/IEC JTC1/SC29/WG11 MPEG2012/M25152, Apr. 2012, Geneva, CH, XP30053495, 7 pages.

ARIB Standard, "Multimedia Coding Specification for Digital Broadcasting (Second Generation)", ARIB STD-B62 Version 1.0 (Fascicle 1), Association of Radio Industries and Businesses , Jul. 31, 2014, 92 pages.

International Search Report dated Apr. 18, 2017, in PCT/JP2017/001434 filed Jan. 17, 2017.

Baba, A., "4. New Closed Captioning and Character Superimposition System and Service Examples for Super Hi-Vision Satellite Broadcasting", The Journal of the Institute of Image information and Television Engineers, vol. 69, No. 7, Sep. 2015, pp. 693-696, with an English-Language Translation.

ARIB, "MMT-Based Media Transport Scheme in Digital Broadcasting Systems", ARIB Standard, ARIB STD-B60, vol. 1.0, Association of Radio Industries and Businesses, Jul. 2014, 38 pp. 29-38 and pp. 114-121, with an English-Language Translation.

ARIB, "Multimedia Coding Specification for Digital Broadcasting (Second Generation)", ARIB Standard, ARIB STD-B62, vol. 1, Part 3, Version 1.0-E1 (Fascicle 1), Association of Radio Industries and Businesses, Jul. 2014, pp. 60-75.

The caption system and service case in the Autumn Autumn, Chapter 4 Super High Vision Broadcasting, Journal of Japan, General Incorporated Video Information Media Society, Sep. 1, 2015, vol. 63.

MMT-Based Media Transport Scheme in Digital Broadcasting Systems, AFB STD-B60, Japan, General Incorporated Radio Industries Association, Jul. 31, 2014, 1.0 edition, pp. 29 to 38, 114 (Document indicating well-known arts) in digital broadcast.

Multimedia Coding Specification for Digital Broadcasting (second generation), AFB STD-B62, Japan, General Incorporated Radio Industries Association, Jul. 31, 2014, 1.0 edition (first division), pp. 63-78.

Notice of Reasons for Refusal dated Oct. 13, 2020, issued in corresponding Japanese patent application No. 2017-562823.

Sungryeul Rhyu: "[MMT] CE Report on E.3-LD",100. MPEG Meeting: Apr. 30, 2012-May 4, 2012: Geneva; (Motionpicture Expert Group or ISO/IEC JTC1/SC29/WG11), No. m25152, May 3, 2012 (May 3, 2012), XP030C53495,3, 7 pages.

* cited by examiner

*FIG. 3*

TTML CONFIGURATION

```
<tt xml:lang="" xmlns="http://www.w3.org/ns/ttml">
   <head>
      <metadata/>
      <styling/>
      <layout/>
   </head>
   <body/>
</tt>
```

| Syntax | Size | Type |
|---|---|---|
| PES_packet() { | | |
|   PES_startcode_prefix | 24 | bslbf |
|   stream_id | 8 | bslbf |
|   PES_packet_length | 16 | uimsbf |
|   Optional_PES_header() | | |
|   PES_packet_data_byte | 8 | |
| } | | |

(b)

| Syntax | Size | Type |
|---|---|---|
| PES_data_byte_field() { | | |
|   data_identifier | 8 | bslbf |
|   subtitle_stream_id | 8 | bslbf |
|   while nextbits() == '0000 1111' { | | |
|     TimedTextSubtitling_segments() | | |
|   } | | |
|   end_of_PES_data_field_marker | 8 | "0xff" |
| } | | |

PES_startcode_prefix  0x000001
Stream_id  1011 1101  private stream1

*FIG. 13*

| segment_type | DESCRIPTION OF KINDS OF SEGMENT |
|---|---|
| 0xA0 | Segment carrying complete document |
| 0xA1 | Segment carrying complete <tt> |
| 0xA2 | Segment carrying complete <head> |
| 0xA3 | Segment carrying <body> |
| others | Reserved for future use |

FIG. 14

| Syntax | Size | Type |
|---|---|---|
| document_segment(){ | | |
| sync_byte | 8 | uimsbf |
| segment_type | 8 | uimsbf |
| number_of_regions | 8 | uimsbf |
| for ( I = 0; I < number_of_regions; I++){ | | |
| region_id | 8 | uimsbf |
| } | | |
| document_version_number | 16 | uimsbf |
| latency | 8 | uimsbf |
| segment_length | 16 | uimsbf |
| segment_data_field() | | |
| } | | |

FIG. 15

| Syntax | Size | Type |
|---|---|---|
| tthead_segment(){ | | |
| sync_byte | 8 | uimsbf |
| segment_type | 8 | uimsbf |
| tthead_version_number | 16 | uimsbf |
| segmant_length | 16 | uimsbf |
| segment_data_field() | | |
| } | | |

FIG. 16

| Syntax | Size | Type |
|---|---|---|
| body_segment(){ | | |
| sync_byte | 8 | uimsbf |
| segment_type | 8 | uimsbf |
| fragment_start_flag | 1 | bslbf |
| fragment_end_flag | 1 | bslbf |
| reserved | 6 | 0x3f |
| number_of_regions | 8 | uimsbf |
| for ( I = 0; I < number_of_regions; I++ ){ | | |
| region_id | 8 | uimsbf |
| region_tag_update_flag | 1 | bslbf |
| reserved | 7 | |
| } | | |
| body_version_number | 16 | uimsbf |
| latency | 8 | uimsbf |
| segment_length | 16 | uimsbf |
| segment_data_field() | | |
| } | | |

FIG. 17

| Semantics | |
|---|---|
| sync_byte | UNIQUE WORD INDICATING START OF SEGMENT |
| segment_type | INDICATING KIND OF SEGMENT |
| number_of_regions | INDICATING NUMBER OF REGIONS |
| region_id | REGION IDENTIFICATION INFORMATION |
| region_tag_update_flag | '1' FOR CASE INCLUDING UPDATE OF REGION TAG, AND '0' FOR OTHER CASES |
| fragment_start_flag | INCLUDING FIRST DIVIDED PIECE |
| fragment_end_flag | INCLUDING LAST DIVIDED PIECE |
| Document_version_number | INDICATING UPDATE OF TTML DOCUMENT. INCREMENT VALUE BY 1 ON UPDATE. |
| ttheader_version_number | INDICATING UPDATE OF tt OR head INFORMATION. INCREMENT VALUE BY 1 ON UPDATE. |
| body_version_number | INDICATING UPDATE OF body INFORMATION. INCREMENT VALUE BY 1 ON UPDATE |
| Latency | INDICATING AMOUNT OF DELAY AFTER RECEPTION UNTIL START OF DISPLAY IN TENFOLD VALUE "1" INDICATES DISPLAY DELAY OF 0.1 SECONDS AND "16" INDICATES DISPLAY DELAY OF 1.6 SECONDS |
| segment_length | INDICATING NUMBER OF BYTES AFTER CURRENT ELEMENT |

TRANSMISSION APPARATUS, TRANSMISSION METHOD, RECEPTION APPARATUS, AND RECEPTION METHOD FOR TRANSMITTING SUBTITLE TEXT INFORMATION

TECHNICAL FIELD

The present technology relates to a transmission apparatus, a transmission method, a reception apparatus, and a reception method, and particularly to a transmission apparatus and the like for transmitting subtitle text information.

BACKGROUND ART

Conventionally, subtitle information has been transmitted in bitmap data in, for example, digital video broadcasting (DVB) or the like. In recent years, there has been proposed transmission of subtitle information in text character code or on text basis. In this case, resolution-dependent font development is made on a reception side.

It has been further proposed that in a case where subtitle information is transmitted on text basis, the text information carries timing information. For example, timed text markup language (TTML) in world wide web consortium (W3C) has been proposed for the text information (see Patent Document 1).

A resolution in TTML has been present in order to partially add, change subtitle display, or the like, but there has not been a method for efficiently transmitting text information in this case. That is, conventionally, an entire TTML document (file) has been transmitted even in partially adding or changing subtitle display, for example, which has caused an increase in transmission bit rate.

CITATION LIST

Patent Document

Patent Document 1: Japanese Patent Application Laid-Open No. 2012-169885

SUMMARY OF THE INVENTION

Problems to be Solved by the Invention

The present technology is directed for enhancing transmission efficiency in partially adding or changing subtitle display, for example.

Solutions to Problems

A concept of the present technology lies in
a transmission apparatus including:
a packet generation unit configured to divide a document of subtitle text information with display timing information into a plurality of pieces and to generate a plurality of packets having each divided piece arranged in a payload; and
a transmission unit configured to sequentially transmit the plurality of packets.

In the present technology, a document of subtitle text information with display timing information is divided into a plurality of pieces and a plurality of packets having each divided piece arranged in a payload is generated in the packet generation unit. For example, the document may be in TTML or TTML-derived format. The plurality of packets are sequentially transmitted by the transmission unit.

In this way, in the present technology, a plurality of packets including, in the payload, each divided piece acquired by dividing a document of subtitle text information with display timing information is sequentially transmitted. Thus, only a part to be changed or added can be transmitted in partial y adding or changing subtitle display, for example, thereby enhancing transmission efficiency.

Additionally, in the present technology, for example, the packet generation unit may arrange, in the header of the packet, packet type information corresponding to an attribute of a divided piece arranged in the payload of a packet. The packet type information is arranged in this way, thereby easily grasping which part (for example, <tt> part, <head> part, <body> part, or the like) in the document the attribute of the divided piece arranged in the payload of the packet, or the divided piece is on a reception side.

Additionally, in the present technology, for example, when a divided piece arranged in the payload of a packet is subtitle information to be displayed in a predetermined region, the packet generation unit may arrange, in the header of the packet, identification information indicating the predetermined region. The identification information is arranged in this way, thereby easily grasping which region the subtitle information arranged in the payload of the packet is for on the reception side. The identification information is useful in adding or changing subtitle display of a plurality of regions in parallel.

Further, in the present technology, for example, a document has a head part and a body part, and when a divided piece arranged in a packet is acquired by dividing the body part, the packet generation unit may arrange, in the header of the packet, position information indicating at which of the first, middle, and last of the body part the divided piece is positioned. The position information is arranged in this way, thereby easily grasping at which of the first, middle, and the last of the body part the divided piece arranged in the payload of the packet is positioned on the reception side.

Further, in the present technology, for example, a document has a head part and a body part, and when a divided piece arranged in a packet is acquired by dividing the body part, the packet generation unit may arrange, in the header of the packet, order information indicating the order of the divided part. The order information is arranged in this way, thereby easily grasping what number divided piece in the body Part the divided piece arranged in the payload of the packet is. The information is useful in correctly rearranging the packet supply order in the Internet distribution or the like in a case where it is wrong due to delay, packet retransmission, or the like.

Further, with the present technology, for example, in order to declare the end of a region, only the beginning of which is declared in a predetermined element, the packet generation unit may generate a packet in which the predetermined element, after being updated, is arranged in the payload. Thereby, the end of the region can be properly declared.

Further, another concept of the present technology lies in
a reception apparatus including:
a reception unit configured to sequentially receive a plurality of packets generated by arranging, in the payload, each divided piece acquired by dividing a document of subtitle text information with display timing information into a plurality of pieces, and
a subtitle control unit configured to reconfigure the document by use of each divided piece arranged in the payload of the plurality of packets and to control subtitle display.

In the present technology, the reception unit sequentially receives a plurality of packets generated by arranging, in the payload, each divided piece acquired by dividing a document of subtitle text information with display timing information into a plurality of pieces. Then, the document is reconfigured of each divided piece arranged in the payload of the plurality of packets and subtitle display is controlled in the subtitle control unit.

In this way, the present technology is directed for controlling subtitle display on the basis of each divided piece of a document of subtitle text information with display timing information arranged in the payload of a plurality of received packets. Thus, even in a case where the document is divided and transmitted, subtitle display can be properly conducted. In this case, in a case where subtitle display is partially added or changed, for example, only a part to be changed or added is transmitted, thereby efficiently performing the processing of changing or adding subtitle display.

Effects of the Invention

According to the present technology, it is possible to enhance transmission efficiency in partially adding or changing subtitle display, for example. Additionally, the effects described in the present specification are merely exemplary and are not restrictive, and additional effects may be obtained.

BRIEF DESCRIPTION OF DRAWINGS

FIG. 3 is a diagram for explaining a TTML configuration.

FIG. 4 shows diagrams illustrating an exemplary configuration of a subtitle PES packet and an exemplary configuration of "PES_data_byte_field( )."

FIG. 13 is a diagram illustrating exemplary definitions of segment types.

FIG. 14 is a diagram illustrating an exemplary configuration of a document segment as a segment packet with a segment type of "0xA0."

FIG. 15 is a diagram illustrating an exemplary configuration of a tt head segment as a segment packet with a segment type of "0xA1" or "0xA2."

FIG. 16 is a diagram illustrating an exemplary configuration of a body segment as a segment packet with a segment type of "0xA3."

FIG. 17 is a diagram illustrating the contents of main information in the exemplary configurations of the respective segment packets.

MODE FOR CARRYING OUT THE INVENTION

A mode for carrying out the invention (which will be denoted as "embodiment" below) will be described below. Additionally, the description will be made in the following order.

1. Embodiment
2. Modification

1. EMBODIMENT

[Exemplary Configuration of Transmission/Reception System]

Figure 1:
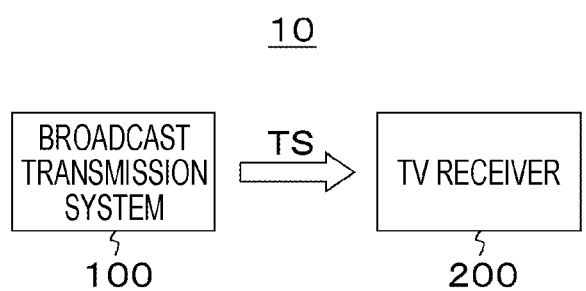
FIG. 1 is a block diagram illustrating an exemplary configuration of a transmission/reception system as an embodiment.

FIG. 1 illustrates an exemplary configuration of a transmission/reception system 10 as an embodiment. The transmission/reception system 10 is configured of a broadcast transmission system 100 and a TV receiver 200. The broadcast transmission system 100 transmits an MPEG-2 transport stream (which will be simply denoted as "transport stream" below) TS as a multiplexed stream on a broadcast wave.

The transport stream TS has a subtitle stream together with a video stream and an audio stream. The video stream is configured of a video PES packet having encoded image data arranged in a payload. The audio stream is configured of an audio PES packet having encoded audio data arranged in the payload.

The subtitle stream is configured of a subtitle PES packet arranging, in the payload, a segment packet having subtitle text information with display timing information, or according to the embodiment, an entire TTML document, or a segment packet having each divided piece obtained by dividing the TTML document. Additionally, the TTML document has a head part and a body part.

The header of the segment packet arranges therein packet type information corresponding to the attribute of the information arranged in the payload of the segment packet, or whether the information is all or part of the document, and if the information is part of the document, which part of the document (for example, <tt> part, <head> part, <body> part, and the like) the information is.

Further, when the information arranged in the payload of the segment packet is part of the document and subtitle information to be displayed in a predetermined region, a region ID (region_id) is arranged as identification information of the predetermined region in the header of the segment packet.

Further, when the information arranged in the payload of the segment packet is a divided piece obtained by dividing the body part of the document, the header of the segment packet arranges therein position information indicating at which of the first, middle, and last of the body part the divided piece is positioned.

Further, when the information arranged in the payload of the segment packet is a divided piece obtained by dividing the body part of the document, order information indicating the order of the divided piece is arranged in the header of the segment packet.

Further, in order to declare the end of a region, only the beginning of which is declared in a predetermined element, a packet in which the predetermined element, after being updated, is arranged in the payload is arranged and transmitted in the payload of the subtitle PES packet.

The TV receiver 200 receives the transport stream TS transmitted from the broadcast transmission system 100 on a broadcast wave. The transport stream TS has the subtitle stream together with the video stream and the audio stream as described above. The subtitle stream is then configured of a subtitle PES packet in which: a segment packet having the entire TTML document or a segment packet having each divided piece obtained by dividing the TTML document is arranged in the payload as described above.

The TV receiver 200 controls subtitle display on the basis of the TTML document extracted from one segment packet, or the TTML document reconfigured of each divided piece of the TTML document extracted from a plurality of segments.

[Exemplary Configuration of Stream Generation Unit in Broadcast Transmission System]

Figure 2:
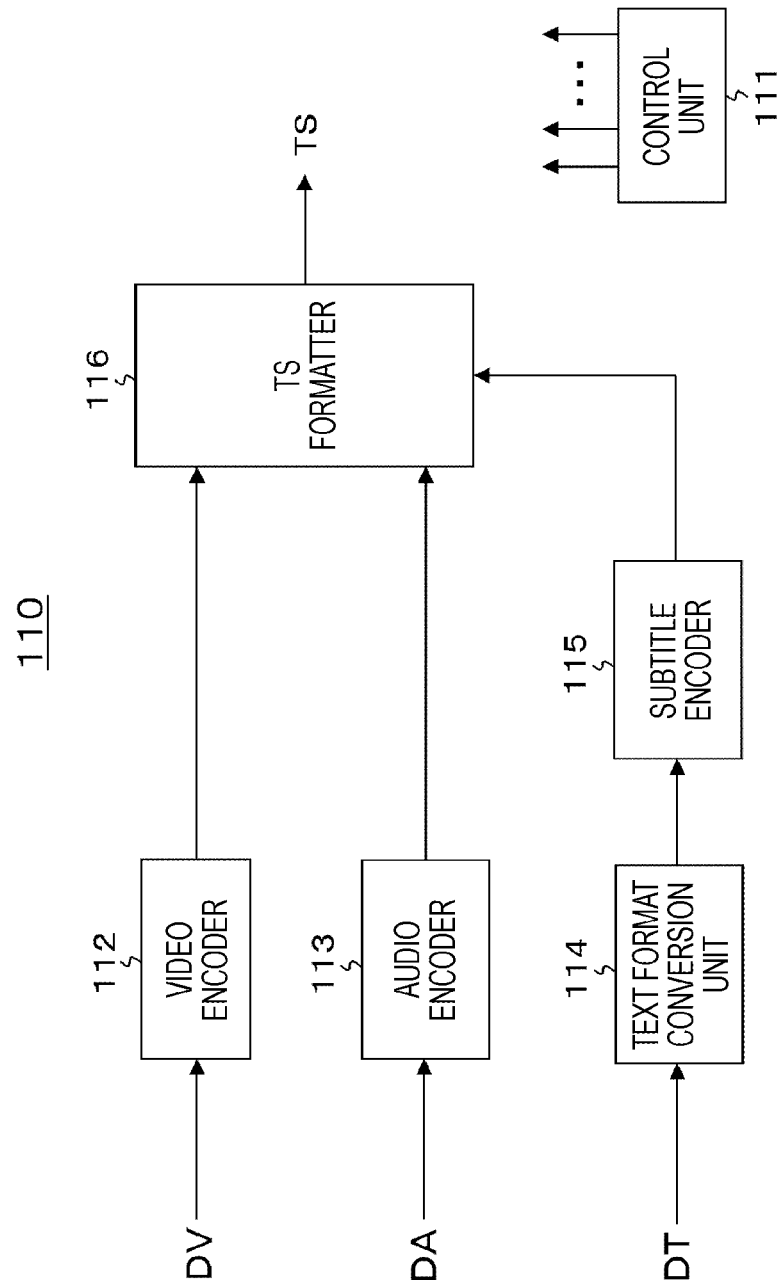
FIG. 2 is a block diagram illustrating an exemplary configuration of a stream generation unit in a broadcast transmission system.

FIG. 2 illustrates an exemplary configuration of a stream generation unit 110 in the broadcast transmission system 100. The stream generation unit 110 has a control unit 111, a video encoder 112, an audio encoder 113, a text format conversion unit 114, a subtitle encoder 115, and a TS formatter (multiplexer) 116.

The control unit 111 includes a central processing unit (CPU), for example, and controls the operations of each unit in the stream generation unit 110. The video encoder 112 inputs image data DV therein, encodes the image data DV, and generates a video stream (PES stream) configured of a video PES packet having the encoded image data in the payload. The audio encoder 113 inputs audio data DA therein, encodes the audio data DA, and generates an audio stream (PES stream) configured of an audio PES packet having the encoded audio data.

The text format conversion unit 114 inputs text data (character code) DT as subtitle information therein, and acquires subtitle text information with display timing information in a predetermined format. The text information may be TTML or TTML-derived format, for example, and is assumed to be TTML according to the present embodiment.

FIG. 3 illustrates an exemplary configuration of a TTML document (file). TTML is described on XML basis. A head and a body are present in TTML. Then, metadata, styling, layout, and the like are present in the head.

Metadata includes title information, copyright information, and the like. A region identifier as well as color information, font information, position information, and the like associated therewith is arranged in styling. Background color information, alignment information, and the like associated with the region identifier are arranged in layout. Subtitle text data to be displayed, timing information indicating the beginning and end of display, and the like associated with the region identifier are arranged in body.

Returning to FIG. 2, the subtitle encoder 115 generates a segment packet (timed text subtitling segment: TT subtitling segment) including the TTML document acquired in the text format conversion unit 114. The subtitle encoder 115 then generates a subtitle stream (PES stream) configured of a subtitle PES packet having the segment packet arranged in the payload.

In this case, the subtitle encoder 115 generates a segment packet including the entire TTML document in order to collectively transmit the TTML document. Alternatively, the subtitle encoder 115 divides the TTML document and generates a plurality of segment packets including each divided piece in order to divide and transmit the TTML document.

FIG. 4(a) illustrates an exemplary configuration of a subtitle PES packet (PES_packet). A fixed pattern of "0x000001" is arranged in a 24-bit field of "PES_start-code_prefix." An 8-bit field of "stream_id" indicates a stream identifier. In the case of the subtitle PES packet, "10111101" as a value indicating "private stream1" is used. A 16-bit field of "PES_packet_length" indicates the number of subsequent bytes as a length (size) of the PES packet.

A field of "Optional_PES_header( )" is present after "PES_packet_length." A time stamp such as PTS or DTS is arranged in the field. A field of "PES_packet_data_byte" is present after the field. The field corresponds to a PES payload. "PES_data_byte_field( )" for containing data is arranged in the field.

FIG. 4(b) illustrates an exemplary configuration of "PES_data_byte_field( )." An 8-bit field of "data_identifier" indicates an identifier for identifying the kind of data in the container part. A conventional subtitle (in the case of bitmap) is assumed to be indicated as "0x20," and thus identification by a new value such as "0x21" is possible in the case of text.

An 8-bit field of "subtitle_stream_id" indicates an identifier for identifying the kind of a subtitle stream. In the case of a subtitle stream for transmitting text information, a new value such as "0x01" is used. Accordingly, it can be discriminated from a subtitle stream "0x00" for transmitting conventional bitmap.

A field of "TimedTextSubtitling_segments ( )" is present subsequent to a pattern of "00001111" after the field of "subtitle_stream_id." A segment packet is arranged in the field. An 8-bit field of "end_of_PES_data_field_marker" is present after the field. The field is a marker indicating the end of the PES packet.

Figure 5:
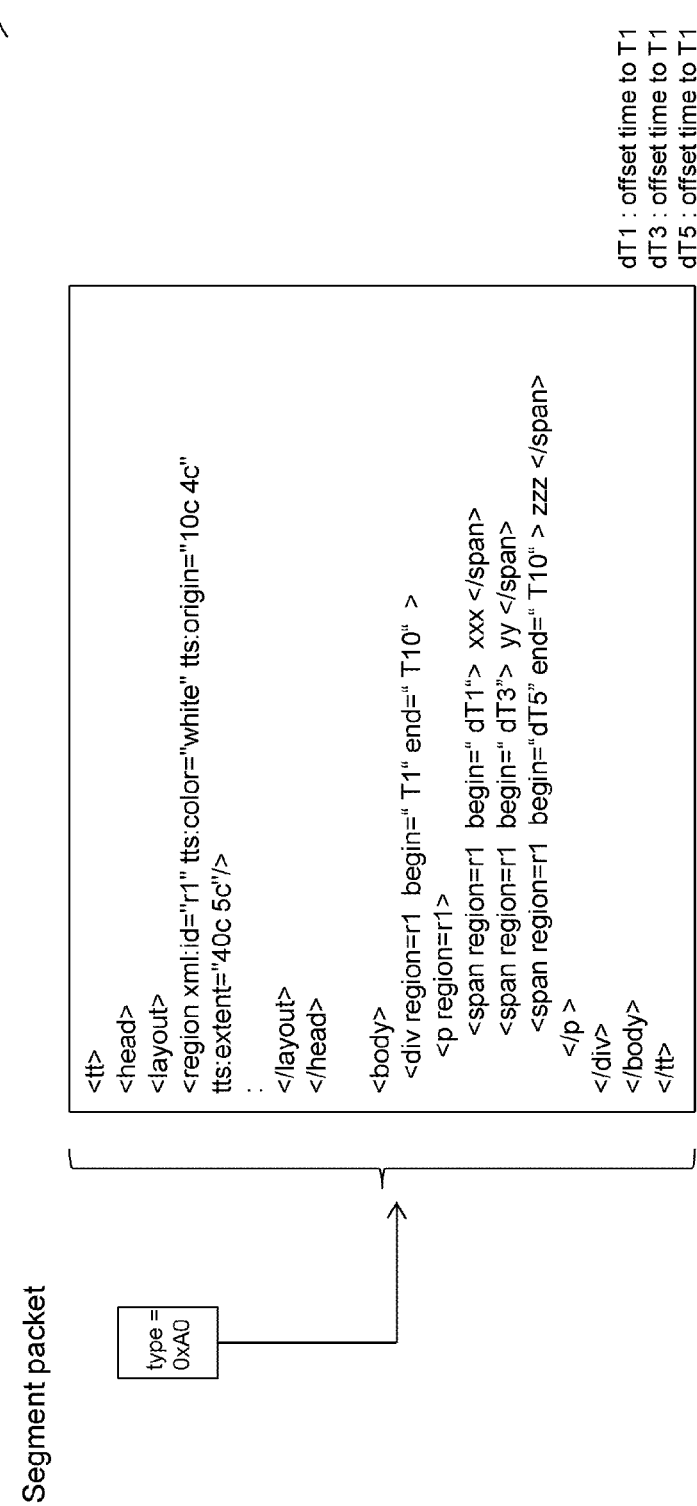
FIG. 5 is a diagram illustrating an exemplary TTML document (one region) in collectively transmitting the TTML document, and transmission of the entire TTML document in corresponding segment packets.

Collective transmission of a TTML document will be described. FIG. 5 illustrates an exemplary TTML document in collectively transmitting the TTML document, and transmission of a segment packet including the entire TTML document and having a segment type (Segment_type) of "0xA0" configuring a packet type.

The illustrated exemplary TTML document assumes that there is one region. A region identifier (id) "r1" as well as color information and position information associated therewith is present in <layout>. Further, <div region=r1 begin="T1" end="T10"> is present as a child of <body> in <body>, and includes the information indicating the beginning timing "T1" and the end timing "T10" in addition to the region identifier "r1."

Further, <p region=r1> is present as a child of <div>, includes the information indicating the region identifier "r1", and is associated with the parent. In addition, <span region=r1 begin="dT1">xxx</span>, <span region=r1 begin="dT3">yy</span>, and <span region=r1 begin="dT5" end="T10">zzz</span> are present as children of <p>. <span>indicates addition of every word or character.

The information indicating the beginning timing "dT1" and the text data "xxx" are included in <span region=r1 begin="dT1">xxx</span>, in addition to the region identifier "r1." They are associated with the parent by the region identifier "r1." Further, the beginning timing "dT1" is assumed as an offset value from the beginning timing "T1" declared by <div>.

The information indicating the beginning timing "dT3" and the text data "yy" are included in <span region=r1 begin="dT3">yy</span>, in addition to the region identifier "r1." They are associated with the parent by the region identifier "r1." Further, the beginning timing "dT3" is assumed as an offset value from the beginning timing "T1" declared by <div>.

The information indicating the beginning timing "dT5" and the end timing "T10," and the text data "zzz" are included in <span region=r1 begin="dT5" end="T10">zzz</span>, in addition to the region identifier "r1." They are associated with the parent by the region identifier "r1." Further, the beginning timing "dT5" is assumed as an offset value from the beginning timing "T1" declared by <div>. Further, the end timing "T10" is assumed as the same timing as the end timing "T10" declared by <div>. The end timing "T10" is already declared by <div>, and thus is not necessarily required.

Figure 6:
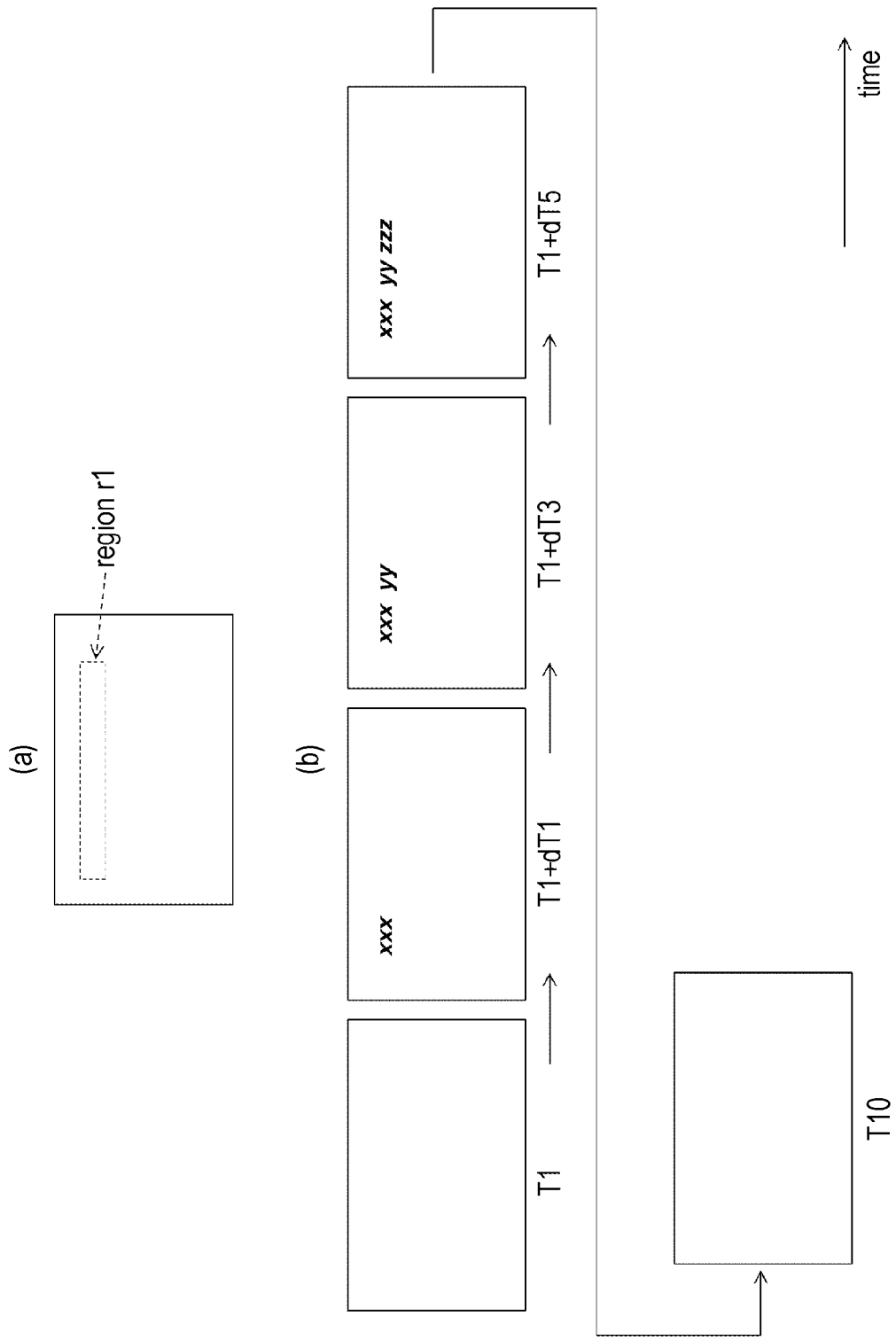
FIG. 6 shows diagrams for explaining subtitle display control based on the TTML document (one region).

The subtitle display control as illustrated in FIG. 6(b) is conducted in the region r1 illustrated in FIG. 6(a) on the reception side on the basis of the TTML document. That is, the region r1 starts being displayed at timing "T1." Thereafter, "xxx" is displayed at timing "T1+dT1," "xxx yy" is displayed at timing "T1+dT3," "xxx yy zzz" is displayed at timing "T1+dT5," and the display ends at timing "T10."

Figure 7:
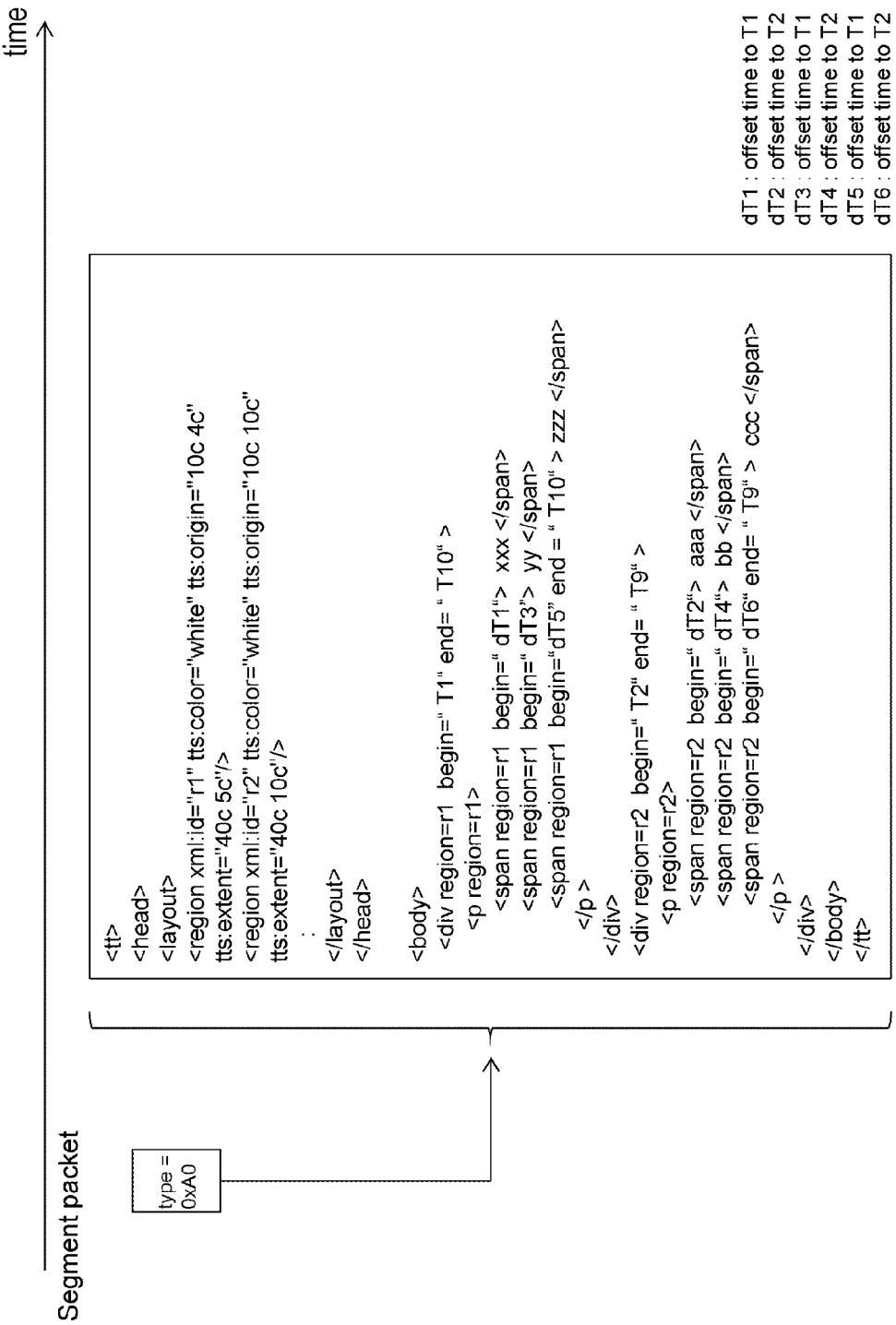
FIG. 7 is a diagram illustrating an exemplary TTML document (two regions) in collectively transmitting the TTML document, and transmission of the entire TTML document in corresponding segment packets.

FIG. 7 also illustrates an exemplary TTML document in collectively transmitting the TTML document, and transmission of a segment packet including the entire TTML document and having a segment type of "0xA0."

The illustrated exemplary TTML document assumes that there are two regions. A first region identifier (id) "r1" as well as color information and position information associated therewith is present in <layout>. Further, a second region identifier (id) "r2" as well as color information and position information associated therewith is present in <layout>.

<div region=r1 begin="T1" end="T10"> is present as a child of <body> in <body>, and includes the information indicating the beginning timing "T1" and the end timing "T10" in addition to the region identifier "r1."

<p region=r1> is present as a child of <div>, includes the region identifier "r1," and is associated with the parent. Further, <span region=r1 begin="dT1">xxx</span>, <span region=r1 begin="dT3">yy</span>, and <span region=r1 begin="dT5" end="T10">zzz</span> are present as children of <p>. The items of <span> are similar to those in the TTML document illustrated in FIG. 5, and thus the description thereof will be omitted.

Further, <div region=r2 begin="T2" end="T9"> is present as a child of <body> in <body>, and includes the information indicating the beginning timing "T2" and the end timing "T9" in addition to the region identifier "r2."

<p region=r2> is present as a child of <div>, includes the region identifier "r2," and is associated with the parent. Further, <span region=r2 begin="dT2">aaa</span>, <span region=r2 begin="dT4">bb</span>, and <span region=r2 begin="dT6" end="T9">ccc</span> are present as children of <p>.

The information indicating the beginning timing "dT2" and the text data "aaa" are included in <span region=r2 begin="dT2">aaa</span>, in addition to the region identifier "r2." They are associated with the parent by the region identifier "r2." Further, the beginning timing "dT2" is assumed as an offset value from the beginning timing "T2" declared by <div>.

The information indicating the beginning timing "dT4" and the text data "bb" are included in <span region=r2 begin="dT4">bb</span>, in addition to the region identifier "r2." They are associated with the parent by the region identifier "r2." Further, the beginning timing "dT4" is assumed as an offset value from the beginning timing "T2" declared by <div>.

The information indicating the beginning timing "dT6" and the end timing "T9," and the text data "ccc" are included in <span region=r2 begin="dT6" end="T9">ccc</span>, in addition to the region identifier "r2." They are associated with the parent by the region identifier "r2." Further, the beginning timing "dT6" is assumed as an offset value from the beginning timing "T2" declared by <div>. Further, the end timing "T9" is assumed as the same timing as the end timing "T9" declared by <div>. The end timing"T9" is already declared by <div>, and thus is not necessarily required.

Figure 8:
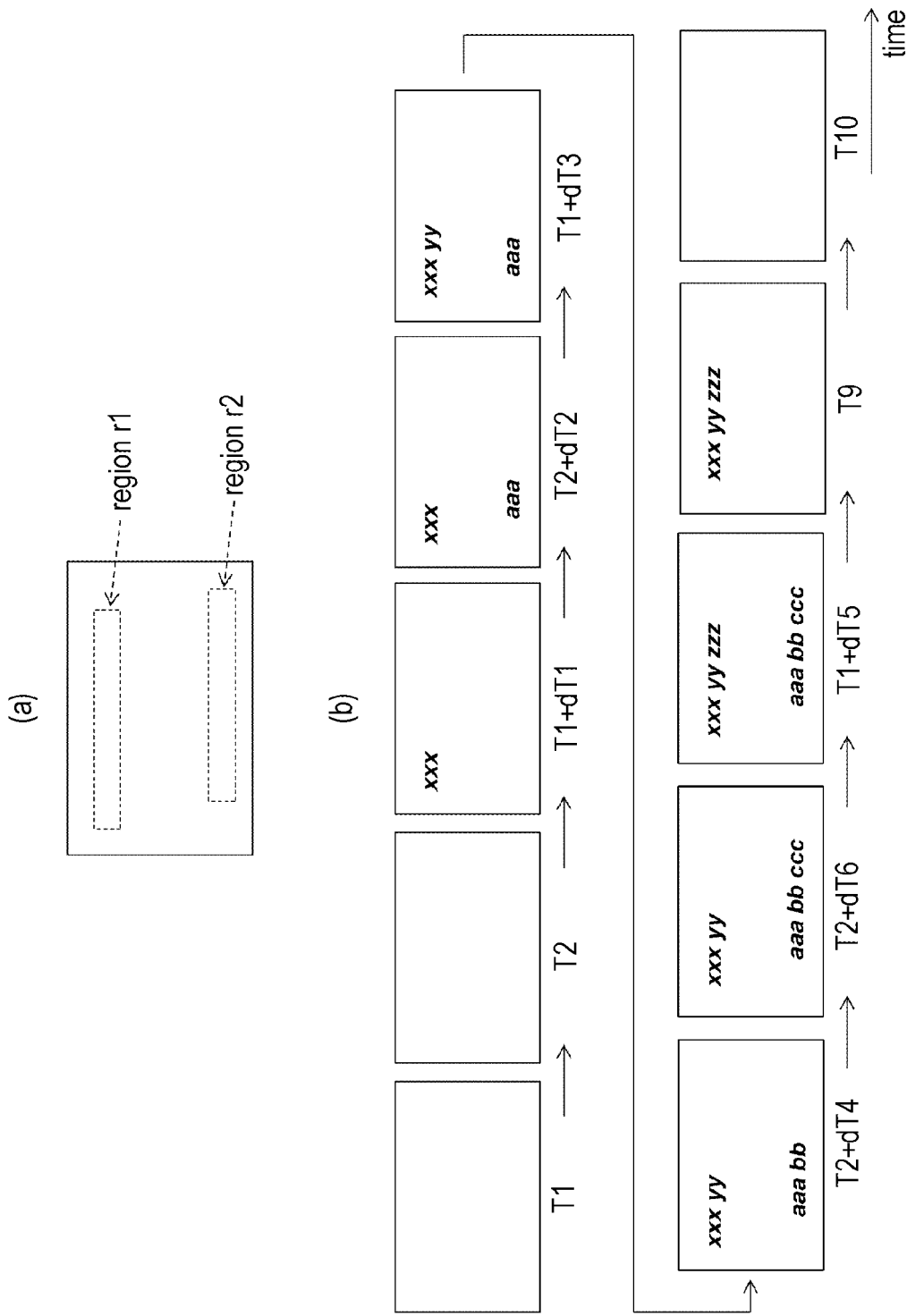
FIG. 8 shows diagrams for explaining subtitle display control based on the TTML document (two regions).

The subtitle display control as illustrated in FIG. 8(b) is conducted in the regions r1 and r2 illustrated in FIG. 8(a) on the reception side on the basis of the TTML document. That is, the region r1 starts being displayed at timing "T1," and the region r2 starts being displayed at later timing "T2."

Thereafter, "xxx" is displayed in the region r1 at timing "T1+dT1," and "xxx" is displayed in the region r1 and "aaa" is displayed in the region r2 at later timing "T2+dT2." Thereafter, "xxx yy" is displayed in the region r1 and "aaa" is displayed in the region r2 at timing "T1+dT3."

Thereafter, "xxx yy" is displayed in the region r1 and "aaa bb" is displayed in the region r2 at timing "T2+dT4." Thereafter, "xxx yy" is displayed in the region r1 and "aaa bb ccc" is displayed in the region r2 at timing "T2+dT6."

Thereafter, "xxx yy zzz" is displayed in the region r1 and "aaa bb ccc" is displayed in the region r2 at timing "T1+dT5." Thereafter, the display in the region r2 ends at timing "T9," and the display in the region r1 ends at timing "T10."

Division and transmission of a TTML document will be described. Here, a TTML document is divided in the following way, for example. That is, <head> is to be completed and transmitted at a time. In the case of updating the <head>, the document is assumed to be a new document. Further, <tt>, <body>, <div>, and <p> can be sent in the opened state. <span> is to be certainly completed and transmitted. A region to display is designated by <div> or <p>. This is directed for securing an association of changes by <span>.

Further, in sending a child element of <div> or <p> (such as <p> or <span>) associated with a region, the same region as in the parent element including it is clearly indicated. This is for securing an association of changes by <span>. Additionally, it may be omitted in a case where only one <div> is used in <tt>. Further, in updating the already-sent element (for example, in later designating "end" in <div>, <p>, <span>, or the like), the element given the same "xml:id" and updated is sent.

Further, the TTML document is reconfigured on the reception side in the following way, for example, in a case where the TTML document is divided and transmitted. Here, it is assumed that <head> is first acquired and only one TTML document is held at the same time.

If the elements in and below <body> with the same "xml:id" are already held, they are regarded as update and are replaced. Further, in the case of <div>, if it is not update, the <div> is assumed to be new. In a case where the TTML document has a plurality of regions, a plurality of <div> are present.

Further, the elements of <p> or <span> are assumed as child elements of <div> or <p> having the same region identifier, respectively. Further, in a case where <div> or <p> remains opened and "end" is not declared, the elements are regarded valid until "end" is declared or the TTML document is closed. Additionally, in a case where the TTML document is closed, all the elements in and below <body> need to be closed.

Figure 9:
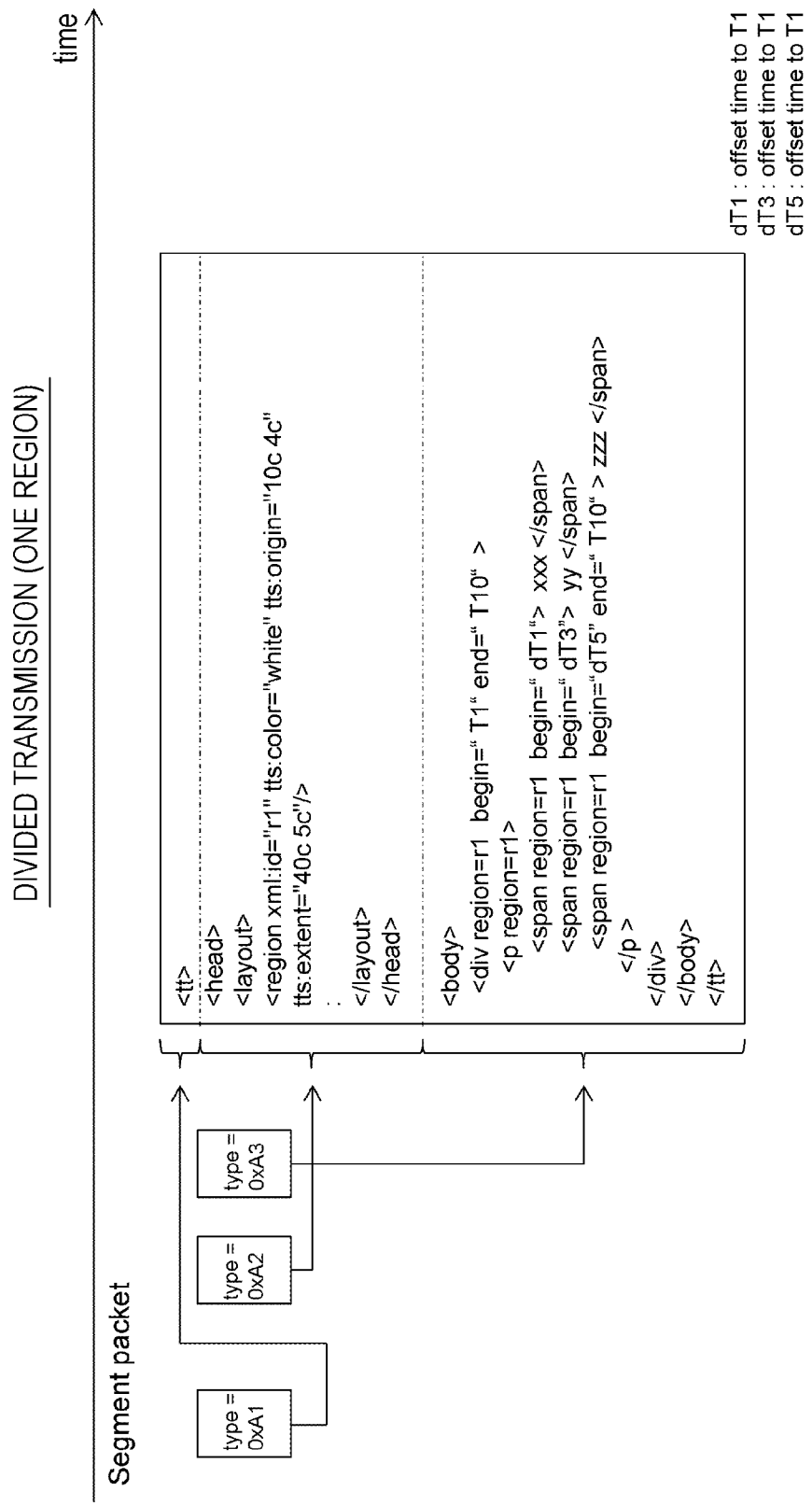
FIG. 9 is a diagram illustrating an exemplary TTML document (one region) in dividing and transmitting the TTML document, and transmission of each divided piece of the TTML document in a corresponding segment packet.

FIG. 9 illustrates an exemplary TTML document in a case where the TTML document (one region) is divided and transmitted, as well as transmission of the <tt> part in the TTML document in a segment packet with a segment type of "0xA1," transmission of the <head> part in a segment packet with a segment type of "0xA2," and transmission of the <body> part in a segment packet with a segment type of "0xA3."

The illustrated exemplary TTML document is the same as the TTML document illustrated in FIG. 5, and thus the detailed description thereof will be omitted. On the reception side, the TTML document is reconfigured of each divided piece of the TTML document transmitted in each segment packet, and the subtitle display control as illustrated in FIG. 6(b) is conducted in the region r1 illustrated in FIG. 6(a) on the basis of the reconfigured TTML document.

Figure 10:
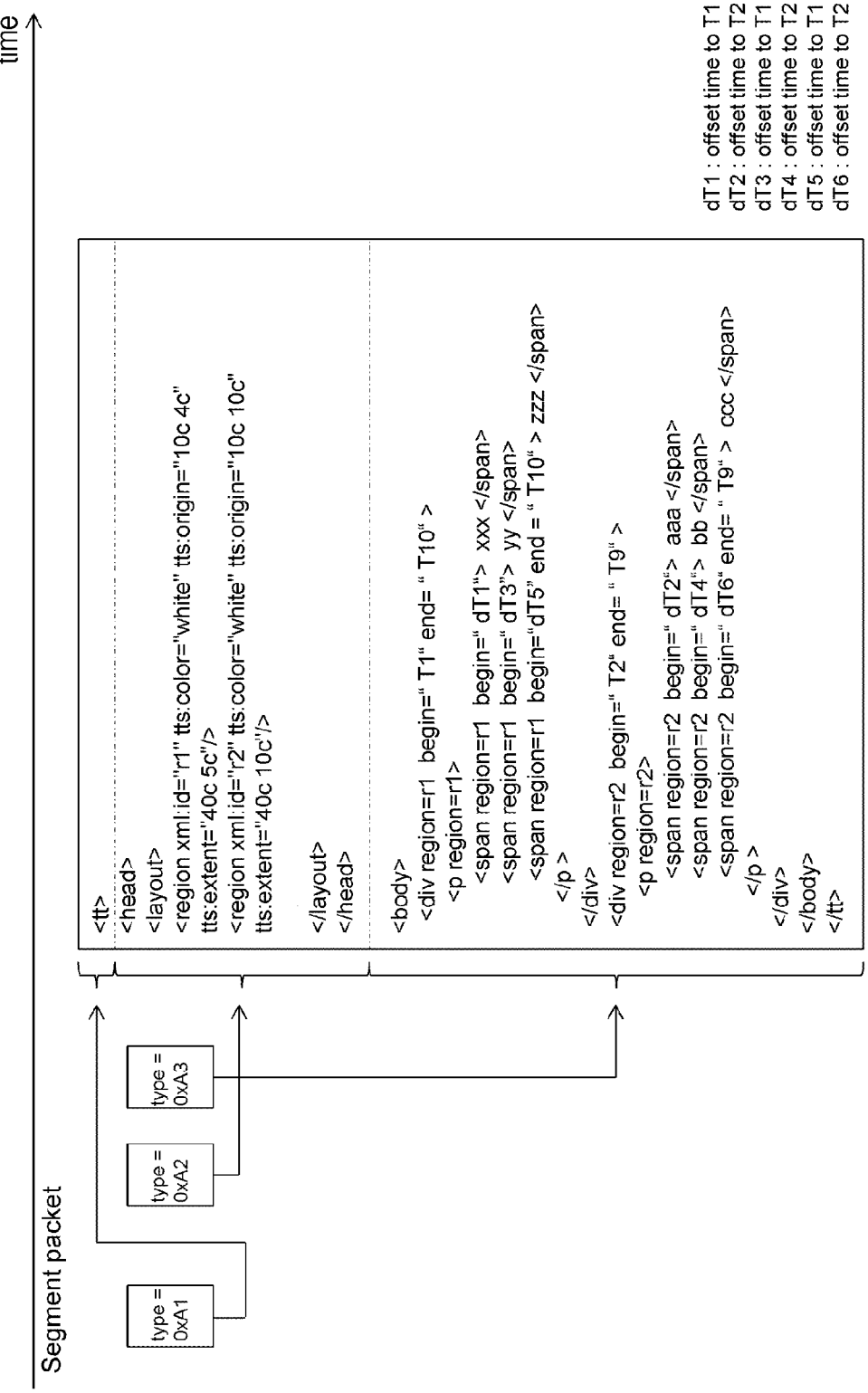
FIG. 10 is a diagram illustrating an exemplary TTML document (two regions) in dividing and transmitting the TTML document, and transmission of each divided piece of the TTML document in a corresponding segment packet.

FIG. 10 illustrates an exemplary TTML document in a case where the TTML document (two regions) is divided and transmitted, as well as transmission of the <tt> part in the TTML document in a segment packet with a segment type of "0xA1," transmission of the <head> part in a segment packet with a segment type of "0xA2," and transmission of the <body> part in a segment packet with a segment type of "0xA3."

The illustrated exemplary TTML document is the same as the TTML document illustrated in FIG. 7, and thus the detailed description thereof will be omitted. On the reception side, the TTML document is reconfigured of each divided piece of the TTML document transmitted in each segment packet, and the subtitle display control as illustrated in FIG. 8(b) is conducted in the regions r1 and r2 illustrated in FIG. 8(a) on the basis of the reconfigured TTML document.

Figure 11:
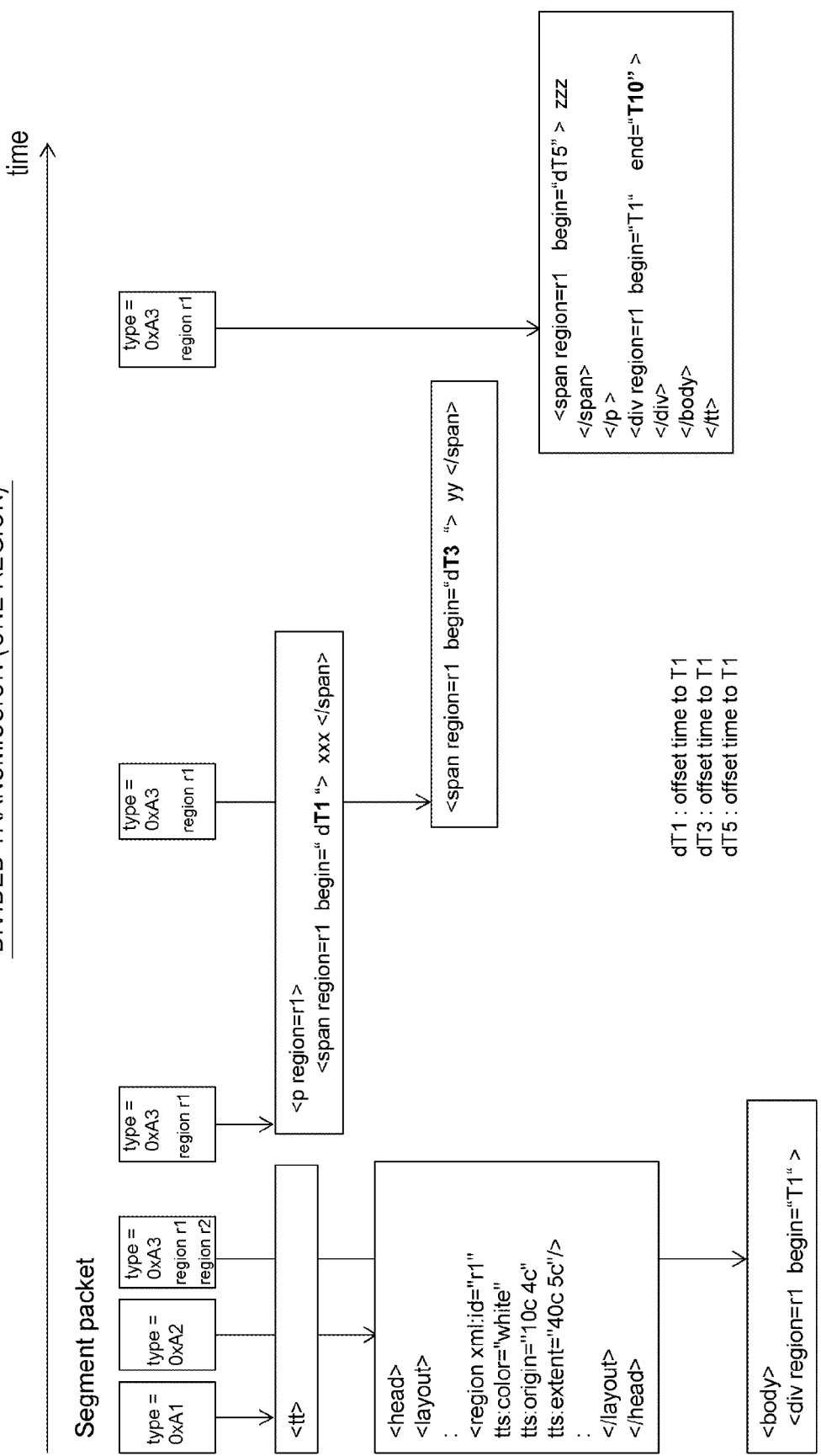
FIG. 11 is a diagram illustrating an exemplary TTML document (one region) in dividing and transmitting the TTML document, and transmission of each divided piece of the TTML document in a corresponding segment packet.

FIG. 11 illustrates an exemplary TTML notation in a case where a TTML document (one region) is divided and transmitted, and transmission of each divided piece of the TTML document in a corresponding segment packet. In the illustrated example, the <tt> part is transmitted in a segment packet with a segment type of "0xA1," the <head> part is transmitted in a segment packet with a segment type of "0xA2," and further the <body> Part is divided into a plurality of pieces and each piece thereof is transmitted in a segment packet with a segment type of "0xA3."

The region identifier (id) "r1" as well as color information and position information associated therewith is present in <layout>.

<div region=r1 begin="T1"> is present as a child of <body> in <body>, and includes the information indicating the beginning timing "T1" in addition to the region identifier "r1." <body> and <div region=r1 begin="T1"> are transmitted in one segment packet.

Further, <p region=r1> is present as a child of <div>, includes the information indicating the region identifier "r1," and is associated with the parent. Further, <span region=r1 begin="dT1">xxx</span>, <span region=r1 begin="dT3">yy</span>, and <span region=r1 begin="dT5">zzz</span> are present as children of <p>.

The information indicating the beginning timing "dT1" and the text data "xxx" are included in <span region=r1 begin="dT1">xxx</span>, in addition to the region identifier "r1." They are associated with the parent by the region identifier "r1." Further, the beginning timing "dT1" is assumed as an offset value from the beginning timing "T1" declared by <div>. <p region=r1> and <span region=r1 begin="dT1">xxx</span> are transmitted in one segment packet.

The information indicating the beginning timing "dT3" and the text data "yy" are included in <span region=r1 begin="dT3">yy</span>, in addition to the region identifier "r1." They are associated with the parent by the region identifier "r1." Further, the beginning timing "dT3" is assumed as an offset value from the beginning timing "T1" declared by <div>. <span region=r1 begin="dT3">yy</span>transmitted in one segment packet.

The information indicating the beginning timing "dT5" and the text data "zzz" are included in <span region=r1 begin="dT5">zzz</span>, in addition to the region identifier "r1" They are associated with the parent by the region identifier "r1." Further, the beginning timing "dT5" is assumed as an offset value from the beginning timing "T1" declared by <div>.

</p> is present subsequent to <span region=r1 begin="dT5">zzz</span>, and <div region=r1 begin="T1" end="T10"> as updated <div> is further present as a child of <body> and includes the information indicating the beginning timing "T1" and the end timing "T10" in addition to the region identifier "r1." Thereby, the end timing of the region r1 is declared (designated) in the form of updating the initially-declared contents or the declaration of only the beginning timing "T1."

</div>, </body>, and </tt> are present after <div> so that the TTML document is closed and <div> and <body> are also closed at the same time. <span region=r1 begin="dT5">zzz</span>, </p>, <div region=r1 begin="T1" end="T10">, </div>, </body>, and </tt> are transmitted in one segment packet.

On the reception side, the divided pieces transmitted in each segment packet are assembled and reconfigured into the TTML notation displayable at the time, and the subtitle display control as illustrated in FIG. 6(b) is conducted in the region r1 illustrated in FIG. 6(a) on the basis of the reconfigured TTML.

Figure 12:
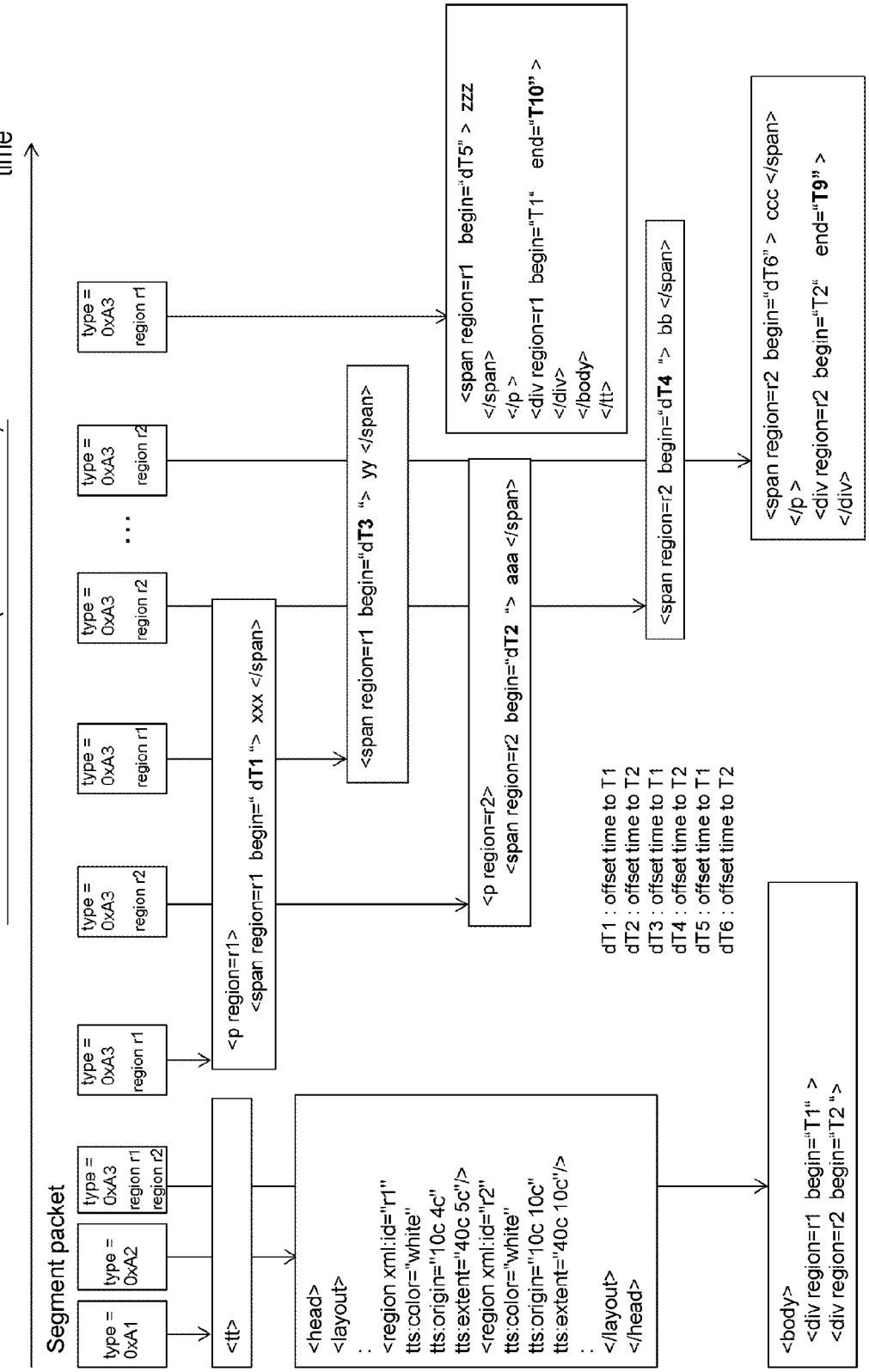
FIG. 12 is a diagram illustrating an exemplary TTML document (two regions) in dividing and transmitting the TTML document, and transmission of each divided piece of the TTML document in a corresponding segment packet.

FIG. 12 illustrates an exemplary TTML notation in a case where a TTML document (two regions) is divided and transmitted, and transmission of each divided piece of the TTML document in a corresponding segment packet. In the illustrated example, the <tt> part is transmitted in a segment packet with a segment type of "0xA1," the <head> part is transmitted in a segment packet with a segment type of "0xA2," and the <body> part is further divided into a plurality of pieces and each divided piece thereof is transmitted in a segment packet with a segment type of "0xA3."

The region identifier (id) "r1" as well as color information and position information associated therewith is present in <layout>. Further, the second region identifier (id) "r2" as well as color information and position information associated therewith is present in <layout>.

<div region=r1 begin="T1"> is present as a child of <body> in <body>, and includes the information indicating the beginning timing "T1" in addition to the region identifier "r1." Further, <div region=r2 begin="T2"> is present as a child of <body> in <body>, and includes the information indicating the beginning timing "T2" in addition to the region identifier "r2." <body>, <div region=r1 begin="T1">, and <div region=r2 begin="T2"> are transmitted in one segment packet.

<p region=r1> is present as a child of <div>, includes the information indicating the region identifier "r1," and is associated with the parent. Further, <span region=r1 begin="dT1>xxx</span>, <span region=r1 begin="dT3">yy</span>, and <span region=r1 begin="dT5">zzz</span> are present as children of <p>.

Further, <p region=r2> is present as a child of <div>, includes the information indicating the region identifier "r2," and is associated with the parent. Further, <span region=r2 begin="dT2">aaa</span>, <span region=r2 begin="dT4">bb</span>, and <span region=r2 begin="dT6">ccc</span> are present as children of <p>.

The information indicating the beginning timing "dT1" and the text data "xxx" are included in <span region=r1 begin="dT1>xxx</span>, in addition to the region identifier "r1." They are associated with the parent by the region identifier "r1." Further, the beginning timing "dT1" is assumed as an offset value from the beginning timing "T1" declared by <div>. <p region=r1> and <span region=r1 begin="dT1">xxx</span> are transmitted in one segment packet.

The information indicating the beginning timing "dT2" and the text data "aaa" are included in <span region=r2 begin="dT2">aaa</span>, in addition to the region identifier "r2." They are associated with the parent by the region identifier "r2." Further, the beginning timing "dT2" is assumed as an offset value from the beginning timing "T2" declared by <div>. <p region=r2> and <span region=r2 begin="dT2">aaa</span> are transmitted in one segment packet.

The information indicating the beginning timing "dT3" and the text data "yy" are included in <span region=r1 begin="dT3">yy</span>, in addition to the region identifier "r1." They are associated with the parent by the region identifier "r1." Further, the beginning timing "dT3" is assumed as an offset value from the beginning timing "T1" declared by <div>. <span region=r1 begin="dT3">yy</span> is transmitted in one segment packet.

The information indicating the beginning timing "dT4" and the text data "bb" are included in <span region=r2 begin="dT4">yy</span>, in addition to the region identifier "r2." They are associated with the parent by the region identifier "r2." Further, the beginning timing "dT4" is assumed as an offset value from the beginning timing "T2" declared by <div>. <span region=r2 begin="dT4">bb</span> is transmitted in one segment packet.

The information indicating the beginning timing "dT6" and the text data "ccc" are included in <span region=r2 begin="dT6">ccc</span>, in addition to the region identifier "r2." They are associated with the parent by the region identifier "r2." Further, the beginning timing "dT6" is assumed as an offset value from the beginning timing "T2" declared by <div>.

</p> is present subsequent to <span region=r2 begin="dT6">ccc</span>, and <div region=r2 begin="T2" end="T9"> as updated <div> is present as a child of <body> and includes the information indicating the beginning timing "T2" and the end timing "T9" in addition to the region identifier "r2." Thereby, the end timing of the region r2 is declared (designated). </div> is present after <div> so that <div> for the region r2 is closed. <span region=r2 begin="dT6">ccc</span>, </p>, <div region=r2 begin="T2" end="T9">, and </div> are transmitted in one segment packet.

Further, the information indicating the beginning timing "dT5" and the text data "zzz" are included in <span region=r1 begin="dT5">zzz</span>, in addition to the region identifier "r1." They are associated with the parent by the region identifier "r1." Further, the beginning timing "dT5" is assumed as an offset value from the beginning timing "T1" declared by <div>.

</p> is present subsequent to <span region=r1 begin="dT5">zzz</span>, and further <div region=r1 begin="T1" end="T10"> as updated <div> is present as a child of <body> and includes the information indicating the beginning timing "T1" and the end timing "T10" in addition to the region identifier "r1." Thereby the end timing of the region r1 is declared (designated).

</div>, </body>, and </tt> are present after <div> so that the TTML document is closed and <div> and <body> are also closed at the same time. <span region=r1 begin="dT5">zzz</span>, </p>, <div region=r1 begin="T1" end="T10">, </div>, </body>, and </tt> are transmitted in one segment packet.

On the reception side, the TTML document is reconfigured of each divided piece of the TTML document transmitted in each segment packet, and the subtitle display control as illustrated in FIG. 8(b) is conducted in the regions r1 and r2 illustrated in FIG. 8(a) on the basis of the reconfigured TTML document.

FIG. 13 illustrates exemplary definitions of segment types (segment_type). "0xA0" indicates a segment packet for transmitting an entire TTML document. "0xA1" indicates a segment packet for transmitting the <tt> part. "0xA2" indicates a segment packet for transmitting the <head> part. "0xA3" indicates a segment packet for transmitting the <body> part.

Exemplary configurations of the segment packets will be described next. FIG. 14 illustrates an exemplary configuration of a document segment "document_segment( )" as a segment packet with a segment type of "0xA0." FIG. 15 illustrates an exemplary configuration of a tt head segment "tthead_segment( )" as a segment packet with a segment type of "0xA1" or "0xA2." FIG. 16 illustrates an exemplary configuration of a body segment "body_segment( )" as a segment packet with a segment type of "0xA3." FIG. 17 illustrates the contents of main information in the exemplary configuration of each segment packet.

The exemplary configuration of the document segment "document_segment( )" illustrated in FIG. 14 will be described. An 8-bit field of "sync_byte" is a unique word indicating the beginning of the segment. An 8-bit field of "segment_type" is a segment type and indicates the kind of the segment. "segment_type" is assumed as "0xA0" in the case of the document segment (see FIG. 13).

An 8-bit field of "number_of_regions" indicates the number of regions included in the TTML document. As many 8-bit fields of "region_id" as the regions are repeatedly present. A field of "region_id" indicates region identification information (id). The region identification information (id) is assumed to correspond to the region identification information (id) in the TTML document.

A 16-bit field of "document_version_number" indicates update of the TTML document information. The value is incremented by 1 on update. An 8-bit field of "latency" indicates the amount of temporal delay after byte data of a first "segment_data_field( )" is input into a buffer (text buffer described later) until subtitle is displayed from a subtitle image buffer. The value is assumed to be 10 times longer than the actual time (in seconds), for example.

A 16-bit field of "segment_length" indicates the number of subsequent bytes as a length (size) of the document segment. A field of "segment_data_field( )" is present after "segment_length." The field corresponds to the payload of the segment (segment packet), and the entire TTML document is arranged therein in the case of the document segment.

The exemplary configuration of the tt head segment "tthead_segment( )" illustrated in FIG. 15 will be described. An 8-bit field of "sync_byte" is a unique word indicating the beginning of the segment. An 8-bit field of "segment_type" is a segment type and indicates the kind of the segment. "segment_type" is assumed as "0xA1" or "0xA2" in the case of the tt head segment (see FIG. 13).

A 16-bit filed of "tthead_version_number" indicates update of the "tt" or "head" information. The value is incremented by 1 on update. A 16-bit field of "segment_length" indicates the number of subsequent bytes as a length (size) of the tt head segment. A field of "segment_data_field( )" is present after "segment_length." The field corresponds to the payload of the segment (segment packet), and the <tt> or <head> part is arranged therein in the case of the document segment.

The exemplary configuration of the body segment "body_segment( )" illustrated in FIG. 16 will be described. An 8-bit field of "sync_byte" is a unique word indicating the beginning of the segment. An 8-bit field of "segment_type" is a segment type and indicates the kind of the segment. "segment_type" is assumed as "0xA3" in the case of the body segment (see FIG. 13).

A 1-bit field of "fragment_start_flag" indicates whether or not the body segment includes the first divided piece of the <body>part. For example, "1" indicates including, and "0" indicates not including. A 1-bit field of "fragment_end_flag" indicates whether or not the body segment includes the last divided piece of the <body> part. For example, "1" indicates including, and "0" indicates not including.

In a case where the body segment includes a middle divided piece of the <body> part, both "fragment_start_flag" and "fragment_end_flag" take "0." The information indicating the fields of "fragment_start_flag" and "fragment_end_flag" configure position information indicating at which of the first, middle, and last in the <body> part a divided piece is positioned. Additionally, in a case where the entire <body> is included in the body segment, both "fragment_start_flag" and "fragment_end_flag" take "1."

An 8-bit field of "number_of_regions" indicates the number of regions included in the body segment. As many 8-bit fields of "region_id" and 1-bit fields of "region_tag_update_flag" as the regions are repeatedly present. A field of "region_id" indicates region identification information (id). The region identification information (id) is assumed to correspond to the region identification information (id) in the information arranged in the payload of the body segment. A field of "region_tag_update_flag" indicates whether or not update of the region tag is included. For example, "1" indicate including, and "0" indicates not including.

A 16-bit field of "body_version_number" indicates update of the <body> information. The value is incremented by 1 on update. The "body_version_number" information configures order information indicating the order of a divided piece. An 8-bit field of "latency" indicates the amount of temporal delay after byte data of the first "segment_data_field( )" is input into a buffer (text buffer described later) until subtitle is displayed from a subtitle image buffer. The value is assumed to be 10 times longer than the actual time (in seconds), for example. A 16-bit field of "segment_length" indicates the number of subsequent bytes as a length (size) of the body segment. A field of "segment_data_field( )" is present after "segment_length." The field corresponds to the payload of the segment (segment packet), and the entire <body> part or divided piece of it is arranged therein in the case of the body segment.

Figure 18:
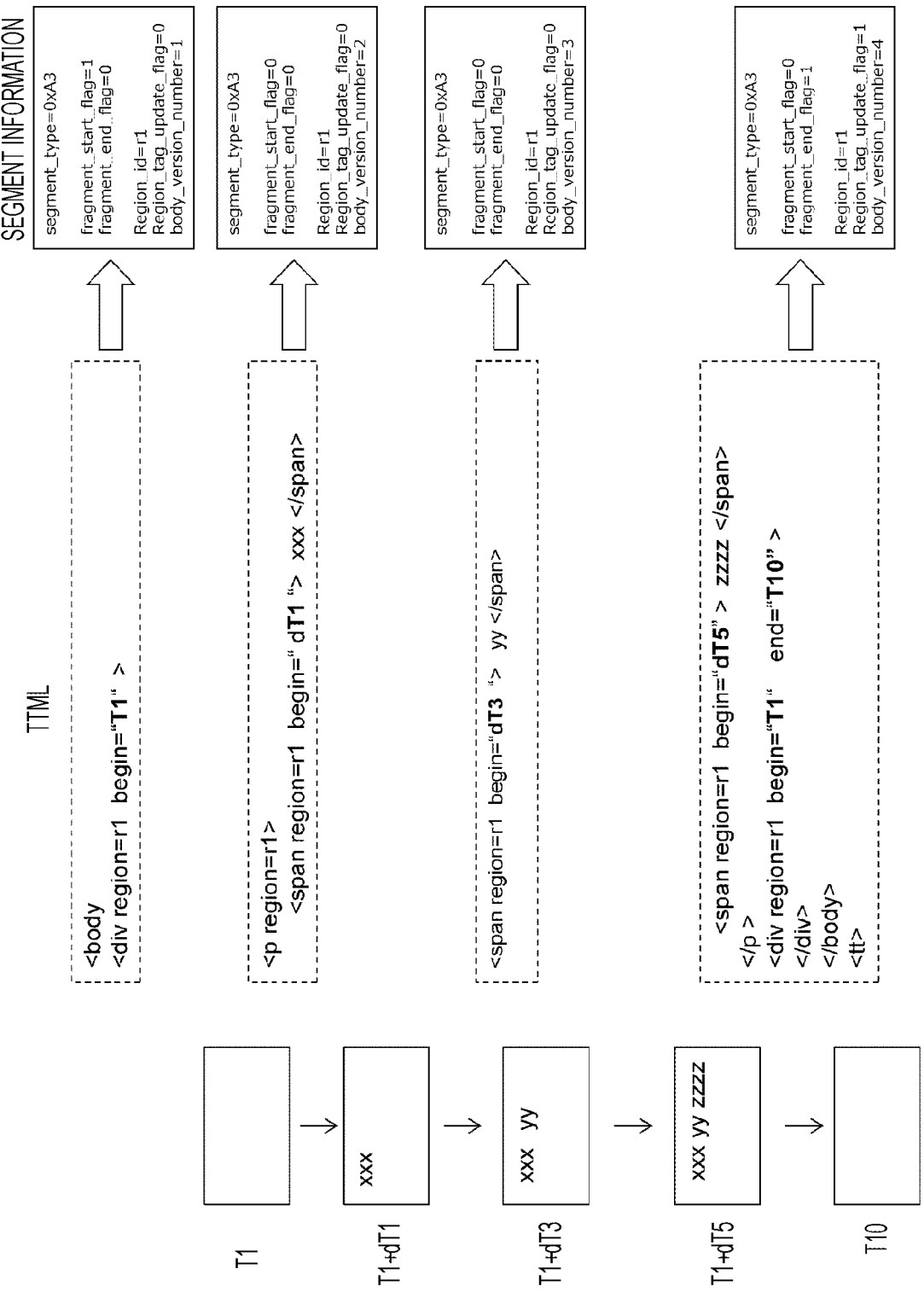
FIG. 18 is a diagram illustrating an exemplary correspondence between TTML information arranged in the payload of each body segment and segment information arranged in the header thereof in a case where the <body> part is divided and transmitted.

FIG. 18 illustrates an exemplary correspondence between TTML information arranged in the payload of each body segment and segment information arranged in the header thereof in a case where the <body> part is divided and transmitted. The illustrated example corresponds to the example of FIG. 11.

In the case of the body segment for transmitting <body> and <div region=r1 begin="T1"> arranged in the payload, the segment information arranged in the header is assumed as "segment_type=0xA3," "fragment_start_flag=1," "fragment_end_flag=0," "region_id=r1," "region_tag_update_flag=0," and "body_version_number=1."

Further, in the case of the body segment for transmitting <p region=r1> and <span region=r1 begin="dT1">xxx</span> arranged in the payload, the segment information arranged in the header assumed as "segment_type=0xA3," "fragment_start_flag=0," "fragment_end_flag=0," "region_id=r1," "region_tag_update_flag=0," and "body_version_number=2."

Further, in the case of the body segment for transmitting <span region=r1 begin="dT3">yy</span> arranged in the payload, the segment information arranged in the header is assumed as "segment_type=0xA3," "fragment_start_flag=0," "fragment_end_flag=0," "region_id=r1," "region_tag_update_flag=0," and "body_version_number=3."

Further, in the case of the body segment for transmitting <span region=r1 begin="dT5">zzz</span>, </p>, <div region=r1 begin="T1" end="T10">, </div>, </body>, and </tt> arranged in the payload, the segment information arranged in the header is assumed as "segment_type=0xA3," "fragment_start_flag=0," "fragment_end_flag=1," "region_id=r1," "region_tag_update_flag=1," and "body_version_number=4."

Returning to FIG. 2, the TS formatter 116 transport-packetizes and multiplexes a video stream generated in the video encoder 112, an audio stream generated in the audio encoder 113, and a subtitle stream generated in the subtitle encoder 115 thereby to acquire a transport stream TS as a multiplexed stream.

The operations of the stream generation unit 110 illustrated in FIG. 2 will be briefly described image data DV is supplied to the video encoder 112. The image data DV is encoded and a video stream (PES stream) configured of a video PES packet having the encoded image data in the payload is generated in the video encoder 112. The video stream is supplied to the TS formatter 116.

Further, audio data DA is supplied to the audio encoder 113. The audio data DA is encoded and an audio stream (PES stream) configured of an audio PES packet having the encoded audio data is generated in the audio encoder 113. The audio stream is supplied to the TS formatter 116.

Further, text data (character code) DT as subtitle information is supplied to the text format conversion unit 114. Subtitle text information with display timing information in a predetermined format, here TTML is acquired in the text format conversion unit 114. TTML is supplied to the subtitle encoder 115.

A segment packet (segment) including the TTML document acquired in the text format conversion unit 114 is generated in the subtitle encoder 115. Then, a subtitle stream (PES stream) configured of a subtitle PES packet having the segment packet arranged in the payload is generated in the subtitle encoder 115. The subtitle stream is supplied to the TS formatter 116.

In this case, a segment packet including the entire TTML document is generated in the subtitle encoder 115 in order to collectively transmit the TTML document. Alternatively, the TTML document is divided and a plurality of segment packets including each divided piece are generated in the subtitle encoder 115 in order to divide and transmit the TTML document.

The streams generated in each encoder are transport-packetized and multiplexed thereby to generate the transport stream TS as a multiplexed stream in the TS formatter 116.

Figure 19:
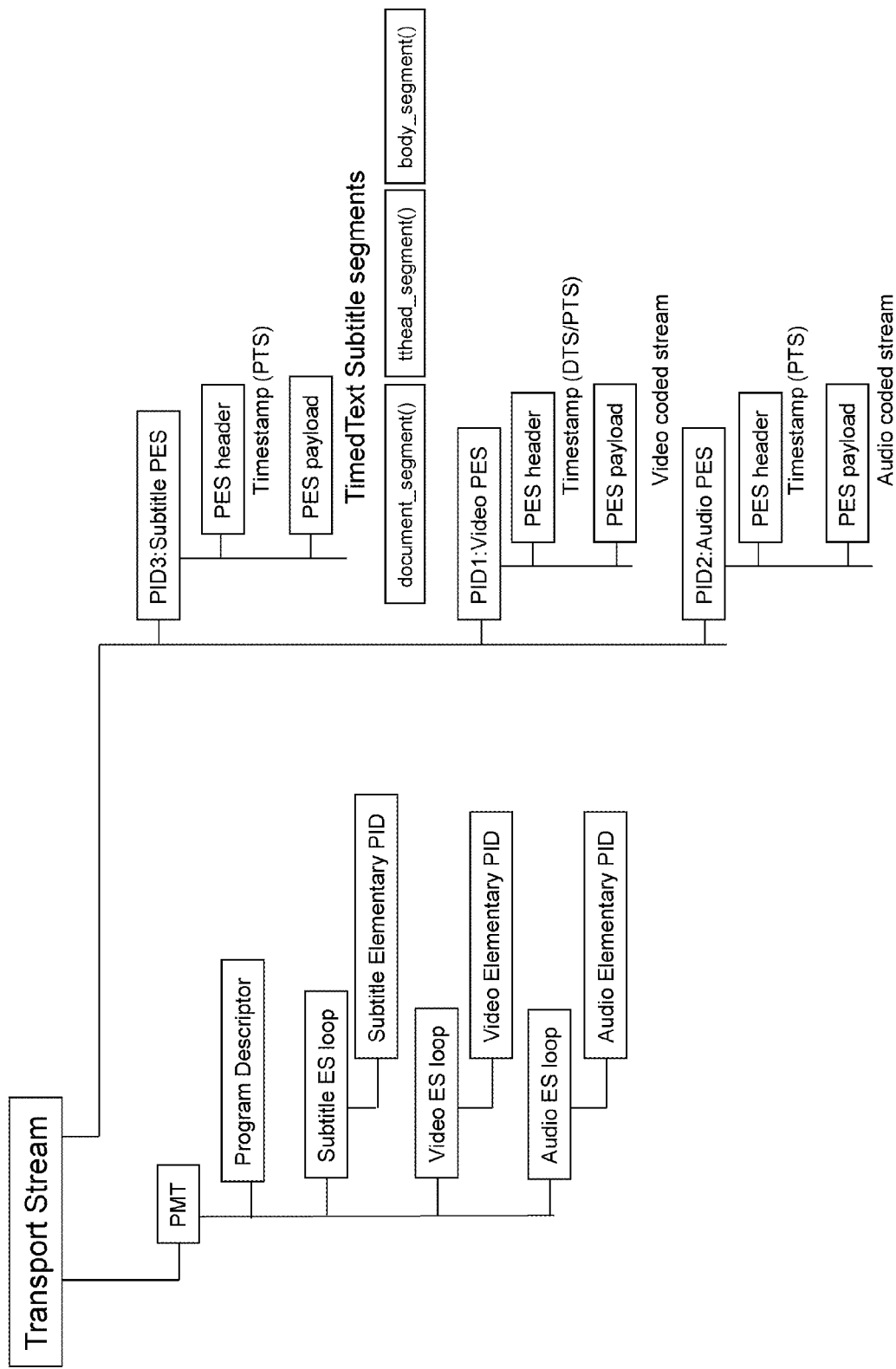
FIG. 19 is a diagram illustrating an exemplary configuration of a transport stream TS.

FIG. 19 illustrates an exemplary configuration of the transport stream TS. In the exemplary configuration, a video PES packet "Video PES" as a PES packet of the PID1-identified video stream is present. Further, in the exemplary configuration, au audio PES packet "Audio PES" as a PES packet of the PID2-identified audio stream is present. Further, in the exemplary configuration, a subtitle PES packet "Subtitle PES" as a PES packet of the PID3-identified subtitle stream is present.

A PES packet is configured of a PES header and a PES payload. A DTS/PTS time stamp is inserted into the PES header and a video encoded stream (encoded image data) is inserted into the PES payload in the video PES packet. Further, a PTS time stamp is inserted into the PES header and an audio encoded stream (encoded audio data) is inserted into the PES payload in the audio PES packet.

Further, a PTS time stamp is inserted into the PES header and a segment packet (timed text subtitling segment: TT subtitling segment) having the entire TTML document or a divided piece of the TTML document is inserted into the PES payload in the subtitle PES packet. The segment packet is a document segment "document_segment( )" a tt head segment "tthead_segment( )," a body segment "body_segment( )," or the like (see FIG. 14, FIG. 15, and FIG. 16). A value corresponding to "begin," which is a relative time of TTML transmitted in the PES payload, is reflected on PTS in the PES header. In a case where division and transmission are performed, a value corresponding to "begin" (an offset from "begin" of <div> is reflected on a value of "begin" of <span>), which is a relative time of TTML divided and transmitted in the PES payload, is reflected on PTS in the PES header.

Further, program map table (PMT) is included as program specific information (PSI) in the transport stream TS. The PSI is information describing a program to which each elementary stream included in the transport stream TS belongs.

A program descriptor for describing information associated with the entire program is present in PMT. Further, an elementary stream loop having the information associated with each elementary stream is present in PMT. In the exemplary configuration, a video elementary stream loop (video ES loop), an audio elementary stream loop (audio ES loop), and a subtitle elementary stream loop (subtitle ES loop) are present. Each loop has information indicating packet identifier (PID) and the like arranged.

[Exemplary Configuration of TV Receiver]

Figure 20:
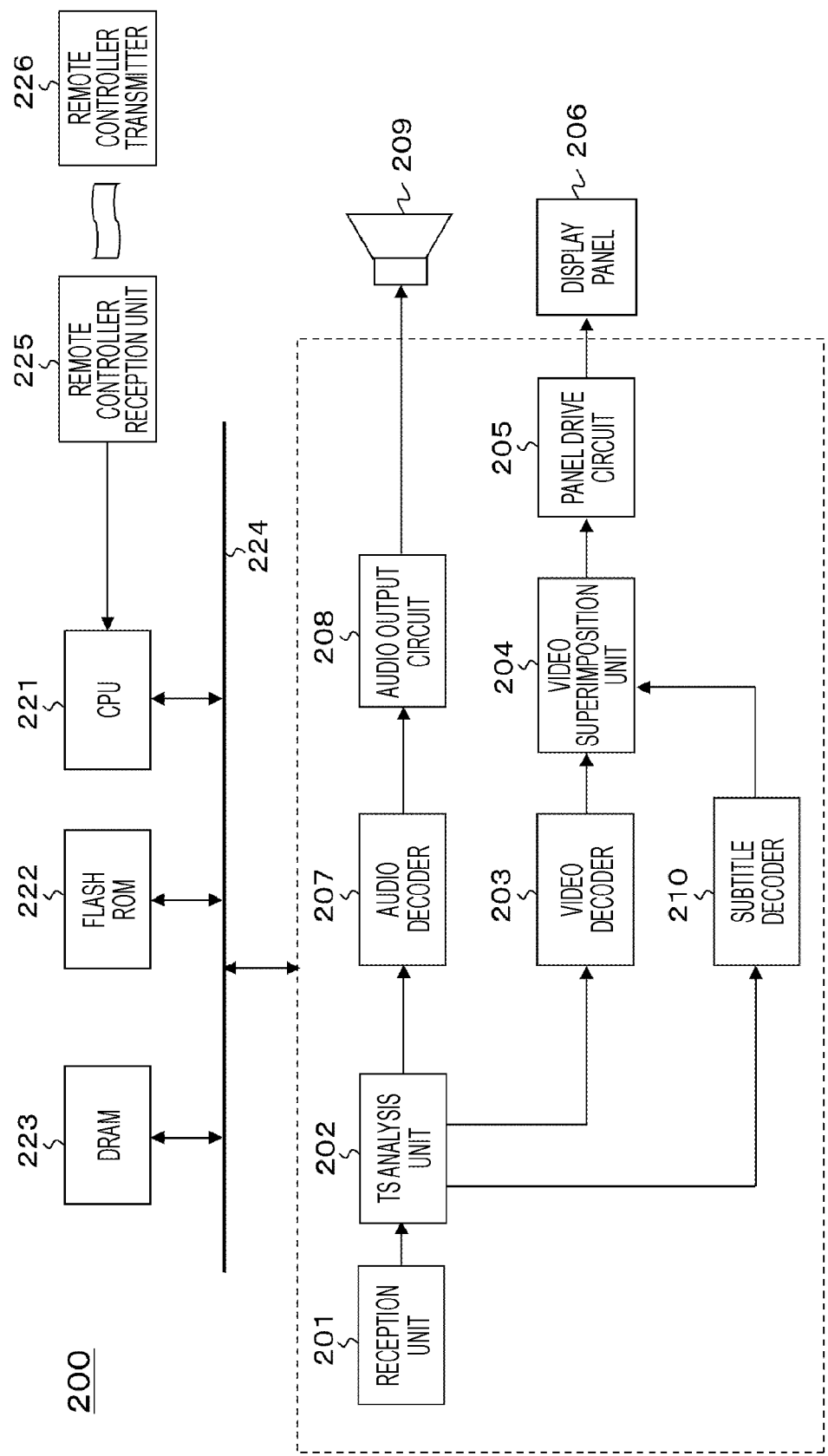
FIG. 20 is a diagram illustrating an exemplary configuration of a TV receiver.

FIG. 20 illustrates an exemplary configuration of the TV receiver 200. The TV receiver 200 has a reception unit 201, a TS analysis unit (demultiplexer) 202, a video decoder 203, a video superimposition unit 204, a panel drive circuit 205, and a display panel 206. The TV receiver 200 further has an audio decoder 207, an audio output circuit 208, a speaker 209, and a subtitle decoder 210. The TV receiver 200 further has a CPU 221, a flash ROM 222, a DRAM 223, an internal bus 224, a remote control reception unit 225, and a remote control transmitter 226.

The CPU 221 controls the operations of each unit in the TV receiver 200. The flash ROM 222 stores control software and saves data. The DRAM 223 configures a work area of the CPU 221. The CPU 221 develops the software or data read from the flash ROM 222 onto the DRAM 223 to activate the software, and controls each unit in the TV receiver 200.

The remote control reception unit 225 receives a remote control signal (remote control code) transmitted from the remote control transmitter 226, and supplies it to the CPU 221. The CPU 221 controls each unit in the TV receiver 200 on the basis of the remote control code. The CPU 221, the flash ROM 222, and the DRAM 223 are connected to the internal bus 224.

The reception unit 201 receives the transport stream TS sent from the broadcast transmission system 100 on a broadcast wave. The transport stream TS includes a video stream, an audio stream, and a subtitle stream as described above. The TS analysis unit 202 extracts each stream of video, audio, and subtitle from the transport stream TS.

The audio decoder 207 performs the decode processing on the audio stream extracted in the TS analysis unit 202 thereby to acquire audio data. The audio output circuit 208 performs a necessary processing such as D/A conversion or amplification on the audio data, and supplies the processed audio data to the speaker 209. The video decoder 203 performs the decode processing on the video stream extracted in the TS analysis unit 202 thereby to acquire image data.

The subtitle decoder 210 performs the decode processing on the subtitle stream extracted in the TS analysis unit 202 thereby to acquire bitmap data of each region to be superimposed on the image data. Here, in a case where the entire TTML document is included and transmitted in one segment packet (document segment) (see FIG. 5 and FIG. 7), the subtitle decoder 210 extracts the TTML document from the segment packet thereby to acquire bitmap data of each region on the basis of the TTML document.

Alternatively, in a case where each divided piece of the TTML document is included and transmitted in a plurality of segment packets (tt head segment and body segment) (see FIG. 9, FIG. 10, FIG. 11, and FIG. 12), the subtitle decoder 210 extracts each divided piece of the TTML document from the plurality of segment packets and reconfigures the TTML document, thereby acquiring bitmap data of each region on the basis of the reconfigured TTML document.

In this case, the subtitle decoder 210 reconfigures the TTML document by use of the segment information (such as "segment_type," "fragment_start_flag," "fragment_end_flag," "region_id," "region_tag_update_flag," and "body_version_number") useful for the reconfiguration, which is arranged in the header of each segment packet.

The video superimposition unit 204 superimposes the bitmap data of each region acquired in the subtitle decoder 210 on the image data acquired in the video decoder 203. The panel drive circuit 205 drives the display panel 206 on the basis of the image data to be displayed which is acquired in the video superimposition unit 204. The display panel 206 is configured of a liquid crystal display (LCD), an organic electroluminescence (EL) display, or the like, for example.

Figure 21:
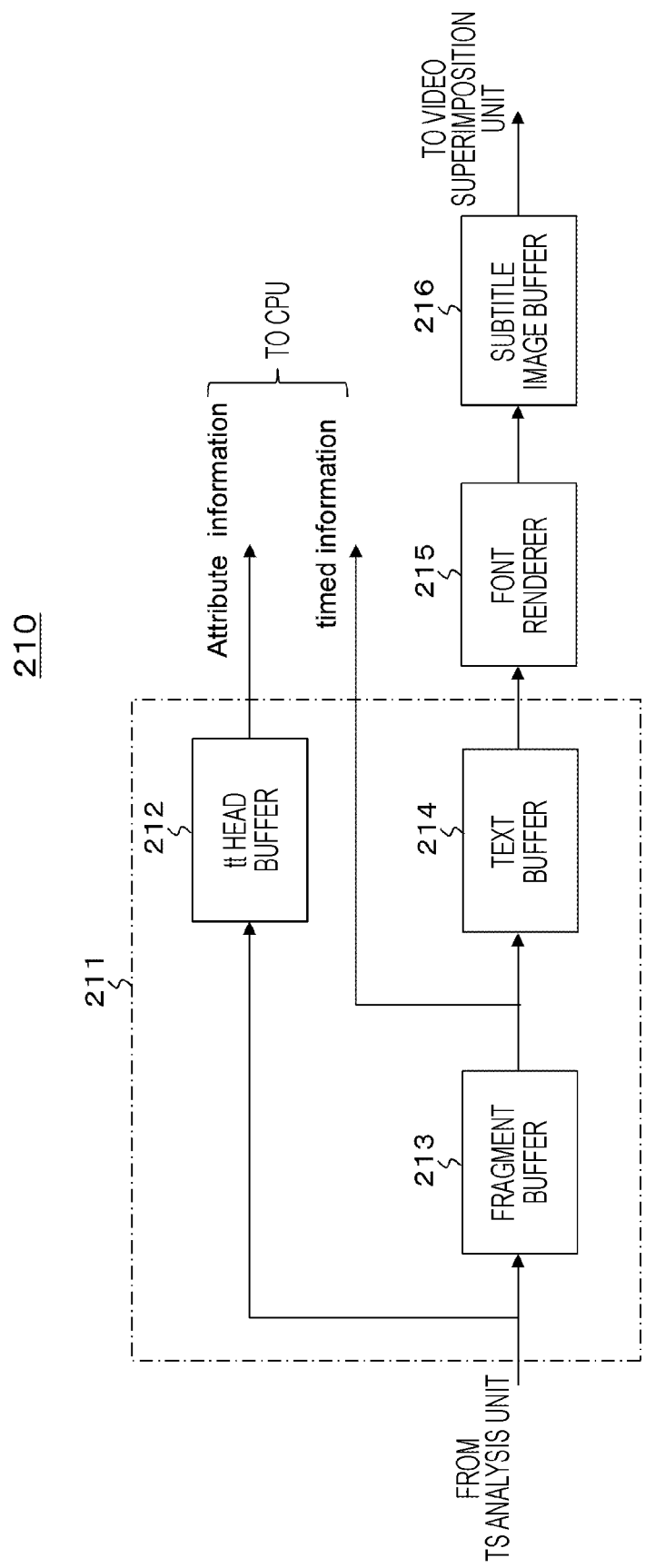
FIG. 21 is a block diagram illustrating an exemplary configuration of a subtitle decoder.

FIG. 21 illustrates an exemplary configuration of the subtitle decoder 210. The subtitle decoder 210 has a buffer unit 211, a font renderer 215, and a subtitle image buffer 216. The buffer unit 211 includes a tt head buffer 212, a fragment buffer 213, and a text buffer 214.

The tt head buffer 212 serves to buffer the <tt> part and the <head> part in the TTML document and to manage the configurations of the elements of the document. The tt head buffer 212 has at least a capacity corresponding to the maximum size of attribute information defined by <tt> and <head>. The fragment buffer 213 temporarily routes via an individual divided piece when the inside of <body> is divided and transmitted. The fragment buffer 213 has at least a capacity corresponding to the maximum size of information sent in <span>.

The text buffer 214 is directed for collectively housing the text data sent in <span> for a required period of time. The minimum size of the text buffer 214 corresponds to the maximum number of characters displayed at the same time. However, the text buffer 214 needs to have as large a size as a plurality of screens in order to enhance transmission flexibility. Then, the maximum size of the text buffer 214 is a capacity capable of saving text for a period of time of a program service.

The font renderer 215 converts text data (font data) into bitmap data (binary image information). The subtitle image buffer 216 buffers the bitmap data (binary image information) acquired in the font renderer 215. Either or both of the text buffer 214 and the subtitle image buffer 216 have as large a capacity as at least two items of text data in units of temporally-adjacent text display in order to receive text to be next displayed during current display.

The attribute information defined by <tt> and <head> in the TTML document supplied from the TS analysis unit 202 is supplied to the CPU 221 via the tt headbuffer 212. Further, the <body> part in the TTML document supplied from the TS analysis unit 202 (also in a case where fragmented and transmitted) is buffered in the fragment buffer 213.

The timed information such as display beginning timing and display end timing in the <body> information buffered in the fragment buffer 213 is supplied to the CPU 221. The CPU 221 controls subtitle display position, display timing, and the like on the basis of the attribute information or the timed information.

The text data in the <body> information buffered in the fragment buffer 213 is buffered in the text buffer 214. The character information displayed at the same time is buffered in the text buffer 214 and the character information is read at a predetermined timing (for example, in synchronization with display of a video picture) and is instantaneously converted from the text data (font data) to the bitmap data (binary image information) in the font renderer 215 to be supplied to the subtitle image buffer 216.

Even before the operation of receiving the subtitle displayed at the same time is completed, the subtitle can be displayed. The display begins with the amount of delay from the reception indicated by LT (corresponding to <divbegin="X"). The subsequent fine display update is at a timing corresponding to <span begin="Y">. Further, the text buffer 214 is switched to next subtitle display at the end of the display period (Div end timing) or at the end of the document (at a timing to detect/perform </tt>). The bitmap data (binary image information) of the subtitle image buffer 216 is sent to the video superimposition unit 204 to be superimposed on the video data (image data) on the basis of the position information from the CPU 221.

Figure 22:
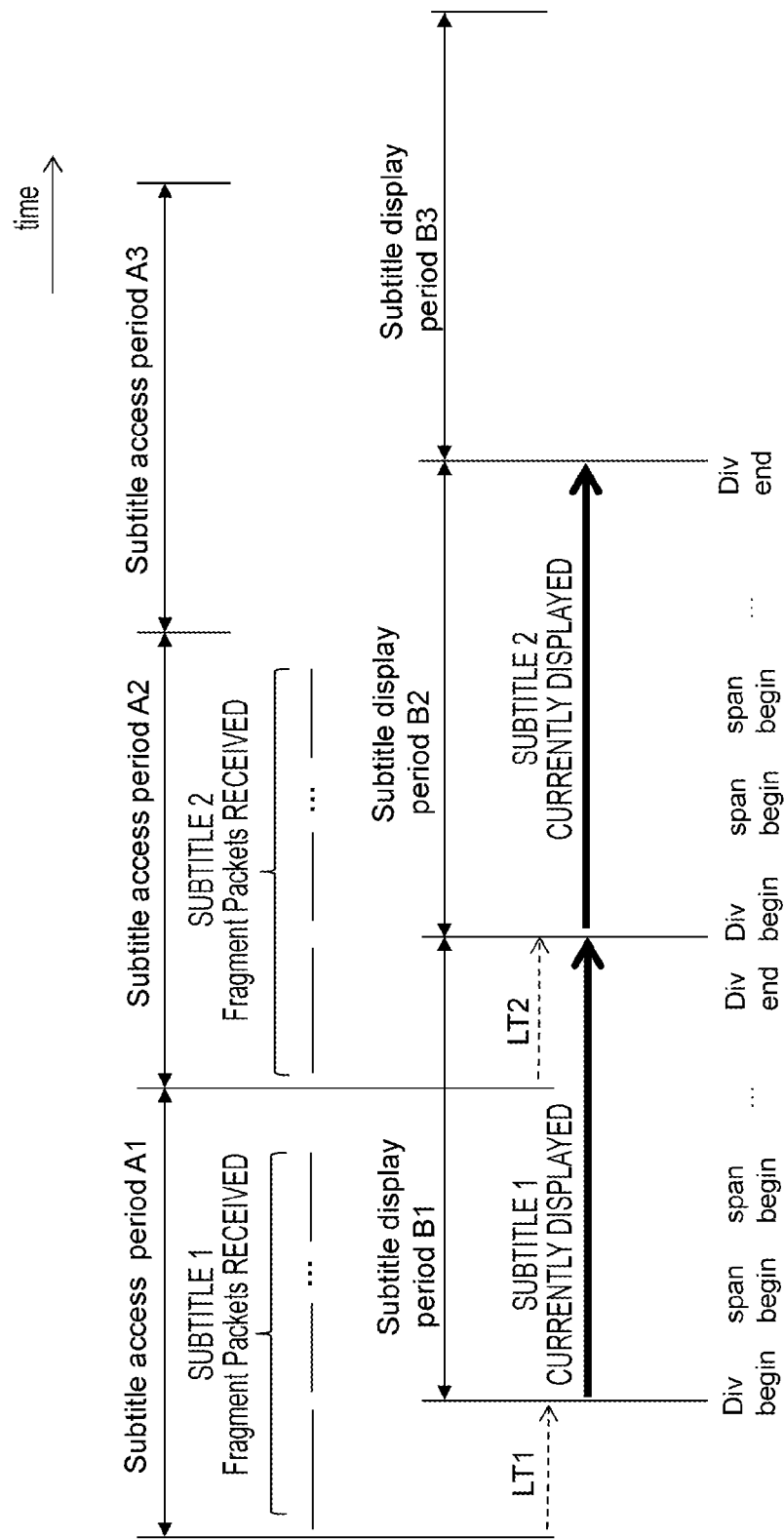
FIG. 22 is a diagram illustrating an exemplary display operation sequence in a case where a TTML document is divided and transmitted in a plurality of segment packets.

FIG. 22 illustrates an exemplary operation sequence in a case where a TTML document divided and transmitted in a plurality of segment packets is received (fragment packets reception) and displayed. A plurality of segment packets are received in a subtitle access period. Then, the subtitle corresponding to the received TTML document is displayed in the subtitle display period.

Figure 23:
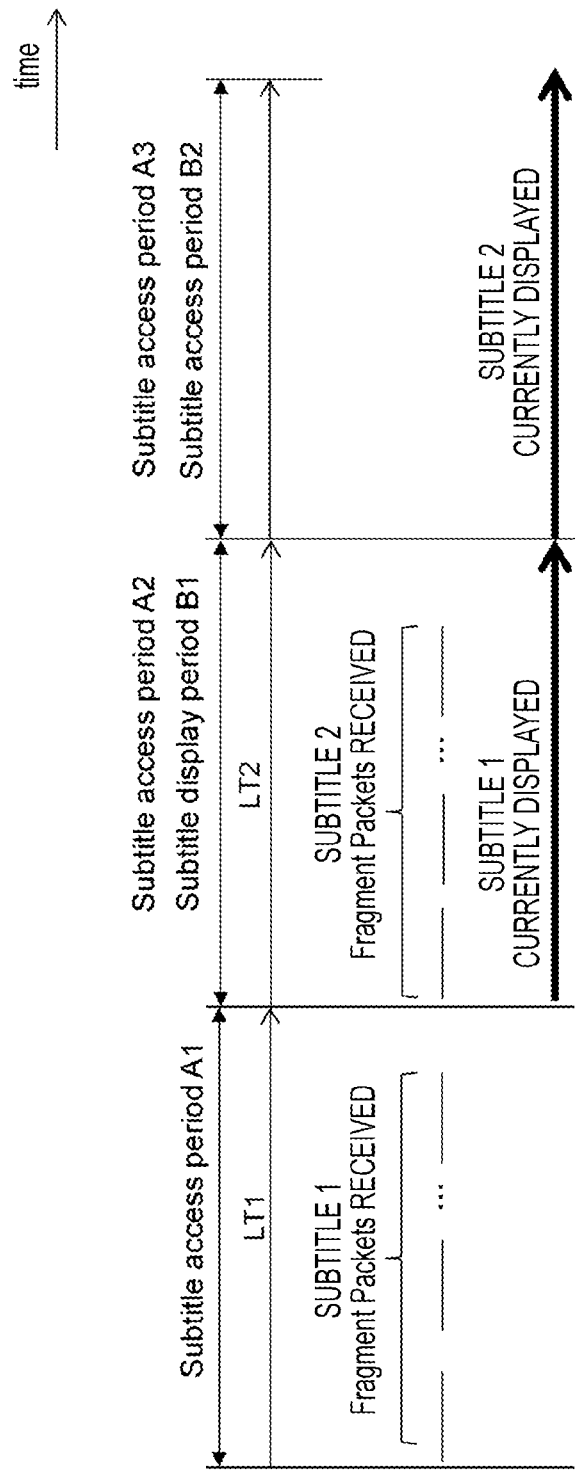
FIG. 23 is a diagram illustrating other exemplary display operation sequence in a case where a TTML document is divided and transmitted in a plurality of segment packets.

In the illustrated example, A1, A2, and A3 do not have to be the same value. LT1 and LT2 indicate the amount of delay after reception and before beginning of display. Normally, LT1 and LT2 are the values corresponding to the element "begin" in subtitle 1 and the element "begin" in subtitle 2, respectively. Here, a case in which A1=A2=A3, LT1=A1, and LT2=A2 is used. The case is equal to the definition of a double-buffer as illustrated in FIG. 23.

The operations of the TV receiver 200 illustrated in FIG. 20 will be briefly described. The reception unit 201 receives the transport stream TS sent from the broadcast transmission system 100 on a broadcast wave. The transport stream TS includes a video stream, an audio stream, and a subtitle stream.

The transport stream TS is supplied to the TS analysis unit 202. The TS analysis unit 202 extracts each stream of video, audio, and subtitle from the transport stream TS. The video stream (PES stream) extracted in the TS analysis unit 202 is supplied to the video decoder 203. The video decoder 203 performs the decode processing on the video stream thereby to acquire image data. The image data is supplied to the video superimposition unit 204.

Further, the subtitle stream (PES stream) extracted in the TS analysis unit 202 is supplied to the subtitle decoder 210. The subtitle decoder 210 performs the decode processing on the subtitle stream thereby to acquire bitmap data of each region to be superimposed on the image data.

For example, in a case where an entire TTML document is included and transmitted in one segment packet (document packet) (see FIG. 5 and FIG. 7), the TTML document is extracted from the segment packet thereby to acquire bitmap data of each region on the basis of the TTML document.

Further, for example, in a case where each divided piece of the TTML document is included and transmitted in a plurality of segment packets (tt head segment and body segment) (see FIG. 9, FIG. 10, FIG. 11, and FIG. 12), each divided piece of the TTML document is extracted from the plurality of segment packets. Then in this case, the TTML document is reconfigured by use of the segment information and the like, and bitmap data of each region is acquired on the basis of the reconfigured TTML document.

The bitmap data of each region output from the subtitle decoder 210 is supplied to the video superimposition unit 204. The bitmap data of each region output from the subtitle decoder 210 is superimposed on the image data acquired in the video decoder 203 in the video superimposition unit 204.

The image data to be displayed acquired in the video superimposition unit 204 is supplied to the panel drive circuit 205. The panel drive circuit 205 drives the display panel 206 on the basis of the video data to be displayed. Thereby, the image on which each region is superimposed is displayed on the display panel 206 (see FIG. 6 and FIG. 8).

As described above, a TTML document can be divided and transmitted in the transmission/reception system 10 illustrated in FIG. 1. In this case, a plurality of segment packets including each divided piece of a TTML document in the payload are sequentially transmitted. In a case where subtitle display is partially added or changed, only a part to be changed or added can be transmitted, thereby enhancing transmission efficiency.

Further, in a case where a plurality of segment packets including each divided piece of a TTML document in the payload are sequentially transmitted in the transmission/reception system 10 illustrated in FIG. 1, the segment information useful for reconfiguration is arranged in the header of each segment packet. Thus, the TTML document can be easily reconfigured of each divided piece of the TTML document on the reception side.

Further, in a case where a plurality of segment packets including each divided piece of a TTML document in the payload are sequentially transmitted in the transmission/reception system 10 illustrated in FIG. 1, the packet type information corresponding to the attribute of a divided piece arranged in the payload of each packet is arranged in the header of the segment packet. Thus, it is possible to easily grasp at which part (for example, the <tt> part, the <head> part, the <body> part, or the like) in the document the attribute of the divided piece arranged in the payload of the segment packet, or the divided piece is positioned, on the reception side.

Further, in a case where a plurality of segment packets including each divided piece of a TTML document in the payload are sequentially transmitted in the transmission/reception system 10 illustrated in FIG. 1, when a divided piece arranged in the payload of a segment packet is subtitle information to be displayed in a predetermined region, the identification information indicating the predetermined region is arranged in the header of the packet. Thus, it is possible to easily grasp which region the subtitle information arranged in the payload of the segment packet is for, on the reception side. The identification information is very useful in adding or changing subtitle display, in a plurality of regions in parallel.

2. MODIFICATION

Additionally, the above embodiment has assumed that TTML is used as subtitle text information with display timing information in a predetermined format. However, the present technology is not limited thereto, and other timed text information with the equivalent information to TTML can be used. For example, a TTML-derived format may be employed.

Further, the transmission/reception system 10 configured of the broadcast transmission system 100 and the TV receiver 200 has been demonstrated in the above embodiment, but the configuration of the transmission/reception system to which the present technology is applicable is not limited thereto. For example, the TV receiver 200 may be configured of a set top box and a monitor connected in a digital interface such as high-definition multimedia interface (HDMI), or the like. Additionally, "HDMI" is a trademark.

Further, the above embodiment has demonstrated that a multiplexed stream is a MPEG-2 transport stream by way of example. The present technology is of course applicable also in a case where a multiplexed stream is an MMT stream, a DASH/ISOBMFF stream, or the like.

Further, the present technology can take the following configurations.

(1) A transmission apparatus including:
a packet generation unit configured to divide a document of subtitle text information with display timing information into a plurality of pieces and to generate a plurality of packets having each divided piece arranged in a payload; and a transmission unit configured to sequentially transmit the plurality of packets.

(2) The transmission apparatus according to (1), in which
the packet generation unit arranges packet type information corresponding to an attribute of the divided piece arranged in the payload of the packet in the header of the packet.

(3) The transmission apparatus according to (1) or (2), in which
when a divided piece arranged in the payload of the packet is subtitle information to be displayed in a predetermined region, the packet generation unit arranges, in the header of the packet, identification information indicating the predetermined region.

(4) The transmission apparatus according to any of (1) to (3), in which
the document has a head part and a body part, and
when a divided piece arranged in the packet is obtained by dividing the body part, the packet generation unit arranges, in the header of the packet, position information indicating at which of the first, middle, and last of the body part the divided piece is positioned.

(5) The transmission apparatus according to any of (1) to (4), in which
the document has a head part and a body part, and
when a divided piece arranged in the packet is obtained by dividing the body part, the packet generation unit arranges, in the header of the packet, order information indicating an order of the divided piece.

(6) The transmission apparatus according to any of (1) to (5), in which
in order to declare the end of a region, only the beginning of which is declared in a predetermined element, the packet generation unit generates a packet in which the predetermined element, after being updated, is arranged in the payload.

(7) The transmission apparatus according to any of (1) to (6), in which
the document is a TTML document or a document in a derived format of the TTML.

(8) A transmission method including:
a packet generation step for a packet generation unit to divide a document of subtitle text information with display timing information into a plurality of pieces and to generate a plurality of packets having each divided piece arranged in a payload; and
a transmission step for a transmission unit to sequentially transmit the plurality of packets.

(9) A reception apparatus including:
a reception unit configured to sequentially receive a plurality of packets generated by arranging, in a payload, each divided piece acquired by dividing a document of subtitle text information with display timing information into a plurality of pieces; and a subtitle control unit configured to reconfigure the document by use of each divided piece arranged in the payload of the plurality of packets and to control subtitle display.

(10) A reception method including:

a reception step for a reception unit to sequentially receive a plurality of packets generated by arranging, in a payload, each divided piece acquired by dividing a document of subtitle text information with display timing information into a plurality of pieces; and a subtitle control step for a subtitle control unit to reconfigure the document by use of each divided piece arranged in the payload of the plurality of packets and to control subtitle display.

A main feature of the present technology is that, in a case where a plurality of packets including, in the payload, each divided piece acquired by dividing a document of subtitle text information with display timing information of, for example, TTML is sequentially transmitted to partially add or change subtitle display, for example, only a part to be changed or added can be transmitted, thereby enhancing transmission efficiency (see FIG. 11).

REFERENCE SIGNS LIST

10 Transmission/reception system
100 Broadcast transmission system
110 Stream generation unit
111 Control unit
112 Video encoder
113 Audio encoder
114 Text format conversion unit
115 Subtitle encoder
116 TS formatter
200 TV receiver
201 Reception unit
202 TS analysis unit
203 Video decoder
204 Video superimposition unit
205 Panel drive circuit
206 Display panel
207 Audio decoder
208 Audio output circuit
209 Speaker
210 Subtitle decoder
211 Buffer unit
212 tt head buffer
213 Fragment buffer
214 Text buffer
215 Font renderer
216 Subtitle image buffer
221 CPU
222 Flash ROM
223 DRAM
224 Internal bus
225 Remote control reception unit
226 Remote control transmitter

The invention claimed is:

1. A transmission apparatus comprising:
processing circuitry configured to:
divide a markup language document that carries subtitle text information and display timing information into a plurality of pieces,
the markup language document including different parts defined by different markup tags, respectively, and
each one of the different parts being divided into one or more corresponding pieces of the plurality of pieces; and
generate a plurality of packets, each one of the packets being configured to carry
a payload portion including a respective piece of the plurality of pieces,
a header portion including a segment type indicator indicating a markup tag of a corresponding part of the different parts to which the respective piece belongs, and
in a case that the segment type indicator indicating that the corresponding part to which the respective piece belongs is a body part of the subtitle text information, a field in the header portion recording a region identifier, the region identifier being also recorded in the respective piece in the payload portion and indicating a display region in which text included in the respective piece is to be displayed; and
transmission circuitry configured to sequentially transmit the plurality of packets as a transport stream in a digital broadcast signal.

2. The transmission apparatus according to claim 1, wherein
the different parts include a head part and the body part,
the body part is divided into at least a first portion, a middle portion, and a last portion of the body part,
first pieces of the pieces correspond to the first portion, the middle portion, and the last portion of the body part, respectively, and
each one of first packets of the packets that carries the first pieces includes in the respective header portion thereof position information indicating which of the first portion, the middle portion, and the last portion of the body part is included in the corresponding first packet.

3. The transmission apparatus according to claim 1, wherein
the different parts include a head part and the body part,
the body part is divided into portions of the body part,
first pieces of the pieces correspond to the portions of the body part, respectively, and
each one of first packets of the packets that carries the first pieces includes in the respective header portion thereof order information indicating an order of the corresponding first piece included in the corresponding first packet with respect to all the first pieces.

4. The transmission apparatus according to claim 1, wherein
the packets include a first packet and a second packet to be transmitted after the first packet,
the first packet carries a first piece of the pieces specifying a beginning timing of a particular display region, and
the second packet carries a second piece of the pieces specifying an ending timing of the particular display region.

5. The transmission apparatus according to claim 1, wherein
the markup language document is in a timed text markup language (TTML) format or a format derived from the TTML.

6. A transmission method comprising:
dividing, by processing circuitry of a transmission apparatus, a markup language document that carries subtitle text information and display timing information into a plurality of pieces, the markup language document including different parts defined by different markup tags, respectively, and each one of the different parts being divided into one or more corresponding pieces of the plurality of pieces;

generating a plurality of packets, each one of the packets being configured to carry a payload portion including a respective piece of the plurality of pieces, a header portion including a segment type indicator indicating a markup tag of a corresponding part of the different parts to which the respective piece belongs, and in a case that the segment type indicator indicating that the corresponding part to which the respective piece belongs is a body part of the subtitle text information, a field in the header portion recording a region identifier, the region identifier being also recorded in the respective piece in the payload portion and indicating a display region in which text included in the respective piece is to be displayed; and sequentially transmitting, by transmission circuitry of the transmission apparatus, the plurality of packets as a transport stream in a digital broadcast signal.

7. A reception apparatus comprising:

receiving circuitry configured to receive a plurality of packets that are sequentially transmitted as a transport stream in a digital broadcast signal; and processing circuitry configured to:

reconfigure a markup language document that carries subtitle text information and display timing information from the plurality of packets, and control subtitle display according to the markup language document, wherein the markup language document includes different parts defined by different markup tags, respectively, each one of the different parts is divided into one or more corresponding pieces of the plurality of packets, and each one of the plurality of packets is configured to carry a payload portion including a respective piece of the plurality of packets, a header portion including a segment type indicator indicating a markup tag of a corresponding part of the different parts to which the respective piece belongs, and in a case that the segment type indicator indicating that the corresponding part to which the respective piece belongs is a body part of the subtitle text information, a field in the header portion recording a region identifier, the region identifier being also recorded in the respective piece in the payload portion and indicating a display region in which text included in the respective piece is to be displayed.

8. A reception method comprising:

receiving, by receiving circuitry of a reception apparatus, a plurality of packets that are sequentially transmitted as a transport stream in a digital broadcast signal;

reconfiguring, by processing circuitry of the reception apparatus, a markup language document that carries subtitle text information and display timing information from the plurality of packets; and controlling subtitle display according to the markup language document, wherein the markup language document includes different parts defined by different markup tags, respectively, each one of the different parts is divided into one or more corresponding pieces of the plurality of packets, and each one of the plurality of packets is configured to carry a payload portion including a respective piece of the plurality of packets, a header portion including a segment type indicator indicating a markup tag of a corresponding part of the different parts to which the respective piece belongs, and in a case that the segment type indicator indicating that the corresponding part to which the respective piece belongs is a body part of the subtitle text information, a field in the header portion recording a region identifier, the region identifier being also recorded in the respective piece in the payload portion and indicating a display region in which text included in the respective piece is to be displayed.

9. The transmission apparatus according to claim 1, wherein the transport stream is a Motion Picture Experts Group (MPEG)-2 transport stream.

* * * * *